US012783619B2

(12) United States Patent
Singh et al.

(10) Patent No.: US 12,783,619 B2
(45) Date of Patent: Nov. 3, 2026

(54) UTILIZING PASSIVE WEARABLE DEVICES TO CAPTURE DEVICE INTERACTION DATA FOR SUPPLEMENTARY AUTHENTICATION

(71) Applicant: Dell Products L.P., Round Rock, TX (US)

(72) Inventors: Tejinder Singh, Manotick (CA); Navjot Kaur Khaira, Manotick (CA); Kan Wang, Ottawa (CA); Ibrahim Abu Alhaol, Nepean (CA)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 19/030,562

(22) Filed: Jan. 17, 2025

(65) Prior Publication Data

US 2026/0211987 A1 Jul. 23, 2026

(51) Int. Cl.

*G06F 21/31* (2013.01)
*H04W 4/80* (2018.01)
*H04W 12/68* (2021.01)

(52) U.S. Cl.

CPC ............ *G06F 21/316* (2013.01); *H04W 4/80* (2018.02); *H04W 12/68* (2021.01)

(58) Field of Classification Search

CPC ........ G06F 21/316; H04W 4/80; H04W 12/68

(Continued)

(56) References Cited

U.S. PATENT DOCUMENTS 2,648,839 A 8/1953 Ford et al.
2,894,261 A 7/1959 Yaru (Continued)

FOREIGN PATENT DOCUMENTS

CN 114168014 A 3/2022
CN 117044035 11/2023
EP 2495621 9/2012

OTHER PUBLICATIONS

"Introducing the New Oura Ring Generation 3" Oura. [https://ouraring.com/blog/oura-generation2-vs-generation3/], retrieved Jul. 3, 2025, 3 pages.

(Continued)

*Primary Examiner* — Aubrey H Wyszynski

(74) *Attorney, Agent, or Firm* — Amin, Turocy & Watson, LLP

(57) ABSTRACT

The technology described herein is directed towards using a wearable passive metasurface (e.g., in the form of a ring) to reflect signals representative of user interaction with computer peripheral devices (e.g., a mouse and keyboard) coupled to a computing device. The reflected signals correspond to user interaction pattern data (user activity profile data) during times of user interaction with the computer. In one implementation, a multi-modal machine learning (ML) classifier processes features of the user interaction pattern data, extracted from time and frequency domain analyses, to recognize habitual interaction patterns of a user, as well as detect any deviations from the user's ordinary interaction behavior, possibly indicating a different user. An interaction pattern that is associated with the user can facilitate ongoing authentication. Deviations from a user's typical interaction pattern also are detectable, whereby the system can generate additional authentication requests or take other security-related actions.

20 Claims, 25 Drawing Sheets

(58) Field of Classification Search
USPC .................................................... 726/17
See application file for complete search history.

(56) References Cited

U.S. PATENT DOCUMENTS

| | | | | |
|---|---|---|---|---|
| 2,981,949 | A | 4/1961 | Elliott | |
| 3,218,644 | A | 11/1965 | Berry | |
| 3,308,467 | A | 3/1967 | Morrison, Jr. | |
| 4,518,967 | A | 5/1985 | Westerman | |
| 5,579,019 | A | 11/1996 | Uematsu et al. | |
| 10,038,690 | B2 | 7/2018 | Andrews et al. | |
| 10,193,880 | B1 | 1/2019 | Jiang et al. | |
| 10,497,227 | B2 * | 12/2019 | Bilal | F03G 7/0614 |
| 10,701,067 | B1 * | 6/2020 | Ziraknejad | H04W 12/63 |
| 11,042,613 | B2 * | 6/2021 | Deole | G06Q 20/322 |
| 11,074,488 | B2 | 7/2021 | Klimt | |
| 11,340,392 | B1 | 5/2022 | Wollack et al. | |
| 11,393,037 | B1 | 7/2022 | Fields et al. | |
| 11,461,687 | B1 | 10/2022 | Shaikh et al. | |
| 11,757,165 | B2 | 9/2023 | Shi | |
| 11,949,673 | B1 | 4/2024 | Sanchez | |
| 12,225,026 | B1 | 2/2025 | Zhou et al. | |
| 12,260,077 | B1 | 3/2025 | V et al. | |
| 12,361,254 | B1 | 7/2025 | Singh et al. | |
| 12,407,681 | B2 * | 9/2025 | Young | G16Y 30/10 |
| 12,556,917 | B2 * | 2/2026 | Singh | H04W 12/06 |
| 2001/0017603 | A1 | 8/2001 | Teshirogi et al. | |
| 2003/0098815 | A1 | 5/2003 | Teshirogi et al. | |
| 2005/0038994 | A1 | 2/2005 | Johnson et al. | |
| 2006/0097942 | A1 | 5/2006 | Tanaka et al. | |
| 2007/0091004 | A1 | 4/2007 | Puuri | |
| 2011/0209372 | A1 | 9/2011 | Padgett et al. | |
| 2012/0056776 | A1 | 3/2012 | Shijo et al. | |
| 2012/0306711 | A1 | 12/2012 | Asplund et al. | |
| 2015/0035643 | A1 | 2/2015 | Kursun | |
| 2015/0109106 | A1 | 4/2015 | Gomez et al. | |
| 2015/0147065 | A1 | 5/2015 | Civelli et al. | |
| 2015/0222023 | A1 | 8/2015 | Shijo et al. | |
| 2016/0028715 | A1 | 1/2016 | Sivashanmugam et al. | |
| 2016/0254396 | A1 | 9/2016 | Casse | |
| 2019/0132399 | A1 | 5/2019 | Henning et al. | |
| 2019/0379120 | A1 | 12/2019 | Manasson et al. | |
| 2020/0005113 | A1 | 1/2020 | Schnippering | |
| 2020/0012912 | A1 | 1/2020 | Klimt | |
| 2020/0042977 | A1 | 2/2020 | Boulby | |
| 2020/0294642 | A1 | 9/2020 | Bostic et al. | |
| 2020/0403647 | A1 | 12/2020 | Bit-Babik et al. | |
| 2021/0028528 | A1 | 1/2021 | Alexanian et al. | |
| 2021/0258314 | A1 | 8/2021 | Tabaja | |
| 2022/0012336 | A1 | 1/2022 | Lakkundi et al. | |
| 2022/0078762 | A1 | 3/2022 | Machado et al. | |
| 2022/0085841 | A1 | 3/2022 | Grétarsson et al. | |
| 2022/0413587 | A1 | 12/2022 | Lagnado et al. | |
| 2023/0155812 | A1 | 5/2023 | Bennison | |
| 2023/0344136 | A1 | 10/2023 | Liu et al. | |
| 2023/0386245 | A1 | 11/2023 | Tada | |
| 2024/0214967 | A1 | 6/2024 | Zorgui et al. | |
| 2024/0248366 | A1 | 7/2024 | Cho et al. | |
| 2024/0250445 | A1 | 7/2024 | Sano | |
| 2024/0310561 | A1 * | 9/2024 | Allen | H01Q 15/0086 |
| 2024/0387998 | A1 | 11/2024 | Wong et al. | |
| 2024/0393433 | A1 | 11/2024 | Elian et al. | |
| 2024/0402342 | A1 | 12/2024 | Knapp et al. | |
| 2024/0406752 | A1 * | 12/2024 | Coskun | H04W 4/02 |
| 2025/0078593 | A1 | 3/2025 | Beuchat et al. | |
| 2025/0309943 | A1 | 10/2025 | Elshafie et al. | |
| 2025/0372886 | A1 | 12/2025 | Wada et al. | |
| 2026/0023831 | A1 * | 1/2026 | Singh | G06F 21/32 |
| 2026/0024921 | A1 | 1/2026 | Singh et al. | |
| 2026/0025156 | A1 | 1/2026 | Singh et al. | |
| 2026/0025158 | A1 | 1/2026 | Singh et al. | |
| 2026/0025159 | A1 | 1/2026 | Singh et al. | |
| 2026/0025160 | A1 | 1/2026 | Singh et al. | |
| 2026/0025161 | A1 | 1/2026 | Singh et al. | |
| 2026/0025172 | A1 | 1/2026 | Singh et al. | |
| 2026/0025199 | A1 | 1/2026 | Singh et al. | |
| 2026/0025200 | A1 | 1/2026 | Singh et al. | |
| 2026/0025655 | A1 * | 1/2026 | Singh | H04W 12/06 |
| 2026/0025761 | A1 * | 1/2026 | Singh | H04W 52/0225 |

OTHER PUBLICATIONS

"Galaxy Ring—Galaxy AI is here" Samsung. [https://www.samsung.com/us/rings/galaxy-ring/?msockid=2bb734e76e306246380e20d36f0b63d2], retrieved Jul. 3, 2025, 19 pages.

Singh, et al. "Long-Term Pattern Recognition Using Proximity Detection for Security Applications" U.S. Appl. No. 19/056,466, filed Feb. 18, 2025, 49 pages.

Singh, et al. "User Authentication in Computer Devices Through Statistical Analysis of Gesture Data" U.S. Appl. No. 19/170,829, filed Apr. 4, 2025, 40 pages.

Notice of Allowance received for U.S. Appl. No. 18/780,245 dated Mar. 21, 2025 25 pages.

Non-Final Office Action received for U.S. Appl. No. 18/775,968 dated Dec. 10, 2025, 34 pages.

Non-Final Office Action received for U.S. Appl. No. 18/775,984 dated Dec. 10, 2025, 28 pages.

Notice of Allowance received for U.S. Appl. No. 18/776,007 dated Oct. 21, 2025, 43 pages.

Notice of Allowance received for U.S. Appl. No. 18/776,018 dated Oct. 24, 2025 40 pages.

Notice of Allowance received for U.S. Appl. No. 18/775,968 dated Apr. 7, 2026, 6 pages.

Notice of Allowance received for U.S. Appl. No. 18/775,984 dated Mar. 25, 2026, 6 pages.

Non-Final Office Action received for U.S. Appl. No. 18/775,993 dated Jan. 28, 2026, 18 pages.

Non-Final Office Action received for U.S. Appl. No. 18/775,999 dated Mar. 23, 2026, 36 pages.

Non-Final Office Action received for U.S. Appl. No. 18/780,280 dated Mar. 11, 2026, 12 pages.

Office Action mailed Jun. 3, 2026 for U.S. Appl. No. 19/056,466, 33 pages.

Notice of Allowance mailed Jun. 24, 2026 for U.S. Appl. No. 18/775,993, 48 pages.

Office Action mailed Jun. 29, 2026 for U.S. Appl. No. 18/776,011, 68 pages.

Notice of Allowance mailed Jul. 2, 2026 for U.S. Appl. No. 18/780,280, 85 pages.

Ohtsuki, T. and Kamai, H., 2016, September. "Biometric authentication using hand movement information from wrist-worn PPG sensors". In 2016 IEEE 27th Annual International Symposium on Personal, Indoor, and Mobile Radio Communications (PIMRC) (pp. 1-5). IEEE. (Year: 2016).

Notice of Allowance mailed Jun. 30, 2026 for U.S. Appl. No. 19/056,466, 69 pages.

Corrected Notice of Allowability mailed May 6, 2026 for U.S. Appl. No. 18/775,968, 41 pages.

Notice of Allowance mailed Jul. 16, 2026 for U.S. Appl. No. 18/780,263, 50 pages.

Notice of Allowance mailed Jul. 7, 2026 for U.S. Appl. No. 19/170,829, 86 pages.

Cao, H., Liu, D., Jiang, H., Wang, R., Chen, Z. and Xiong, J., 2023. "LIPAuth: Hand-dependent light intensity patterns for resilient user authentication". ACM Transactions on Sensor Networks, 19(3), pp. 1-29. (Year: 2023).

* cited by examiner

UTILIZING PASSIVE WEARABLE DEVICES TO CAPTURE DEVICE INTERACTION DATA FOR SUPPLEMENTARY AUTHENTICATION

BACKGROUND

Existing wearable devices (e.g., rings) focus on health and activity monitoring. Such wearable devices rely on establishing a BLUETOOTH communication link with a computing device, such as a personal computer or cellphone. These wearable devices tend to be heavy and thick due to the inclusion of sensors and other components, and in general are expensive because of high manufacturing costs.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1A:
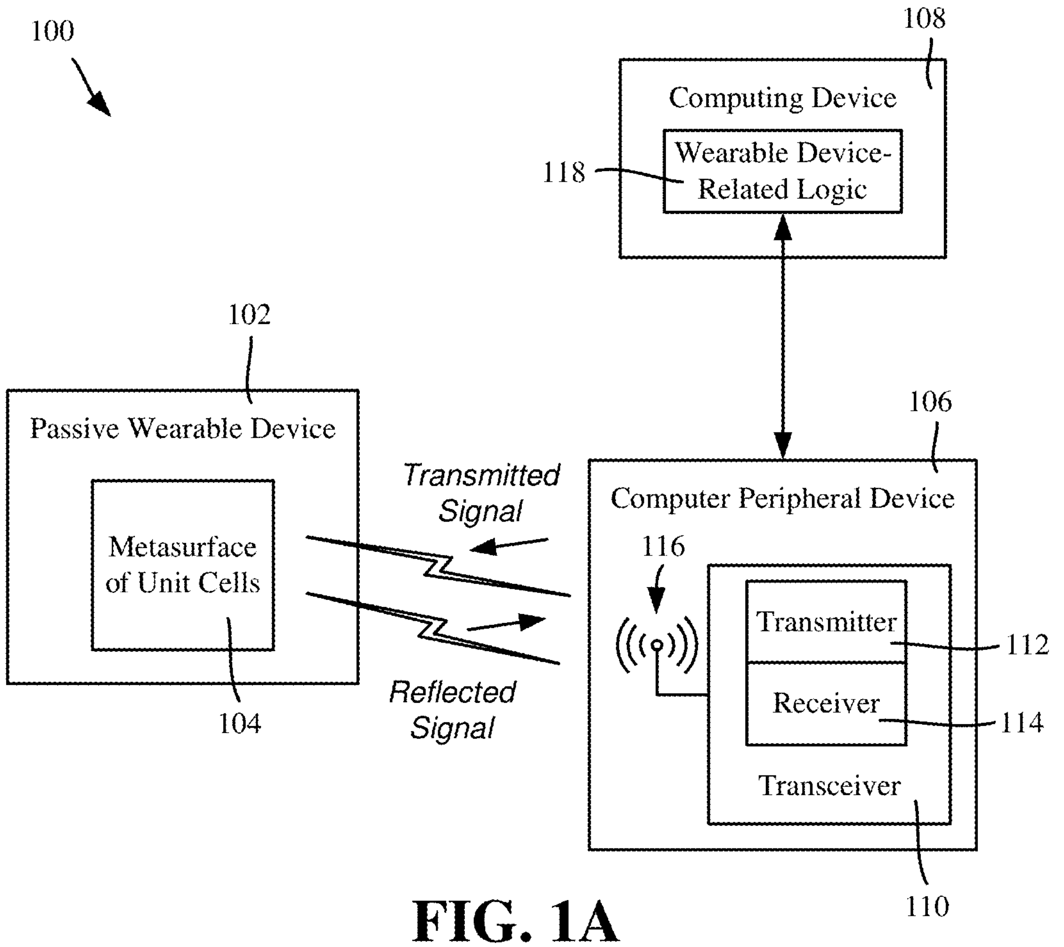
FIG. 1A is a block diagram representation of an example wearable device including a passive metasurface communicating with a computing device via a transceiver embedded in a computer peripheral device, in accordance with various example embodiments and implementations of the subject disclosure.

The technology described herein is generally directed towards detecting user interaction with computer peripheral devices (e.g., a mouse and keyboard) coupled to a computing device, via a wearable metasurface, such as in the form of a ring, that reflects transmitted signals to the computing device. The reflected signals, during times of user interaction with a computer peripheral device/the computing, provide user interaction pattern data (user activity profile data/gesture data) that facilitate the non-intrusive study of user behavior, such as keystrokes and mouse movements.

In one implementation, a multi-modal machine learning (ML) classifier integrates features extracted from time and frequency domain analyses of the reflected user interaction-related signals, to recognize habitual patterns of a user and detect any deviations from the user's ordinary interaction behavior, which can indicate a different user. One usage for the interaction pattern analysis is for regular, ongoing authentication rather than a one-time initial check, providing increased security by more frequently verifying a user's identity based on the user's real-time interaction patterns. If deviations from a user's typical interaction behavior are detected, the system can generate additional authentication requests, thereby enhancing security. Threshold filtering on the received signals can be used to reduce the amount of input data, as well as capture more meaningful interaction data.

An artificial intelligence (AI) learning engine can combine user behavior patterns with contextual factors like location, with can be used to dynamically adjust a security confidence level. For instance, the security confidence level with respect to sensed interaction pattern is higher at a user's home location, and lower in a public space like a cafeteria. This dynamic and personalized approach strengthens security protocols within a zero-trust framework, while adapting to individual behavior and environmental context in a non-intrusive manner, thereby enhancing the overall user experience. To summarize, security in terms of authentication and usability is enriched with the integration of intelligent and responsive peripherals and their associated computing devices.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in RF communications and RF devices in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics, and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1A is a block diagram representation of one example implementation of a system 100 in which a wearable device 102, which includes a metasurface of unit cells 104, communicates with a computer peripheral (device) 106 coupled to a computing device 108. In the example of FIG. 1A, the computer peripheral device 106 includes an embedded, integrated or otherwise internal transceiver 110, which in turn includes a transmitter 112 and receiver 114. The transceiver components are coupled to an antenna 116 that transmits signals to the metasurface 104 of the passive wearable device 102, which as described herein, alters a redirected instance of the signal's characteristics reflected to the transceiver's receiver 114. Based on the received signal, wearable device-related logic 118 (e.g., a hardware or software program running in the computing device 108) can analyze the reflected signal and take some action based thereon as described herein, such as to wake the operating system program or the like for execution in the computing device. It is also feasible for the computer peripheral device 106 to include the wearable device-related logic 118, or the wearable device-related logic 118 can be divided between the computer peripheral device 106 and the computing device 108.

Figure 1B:
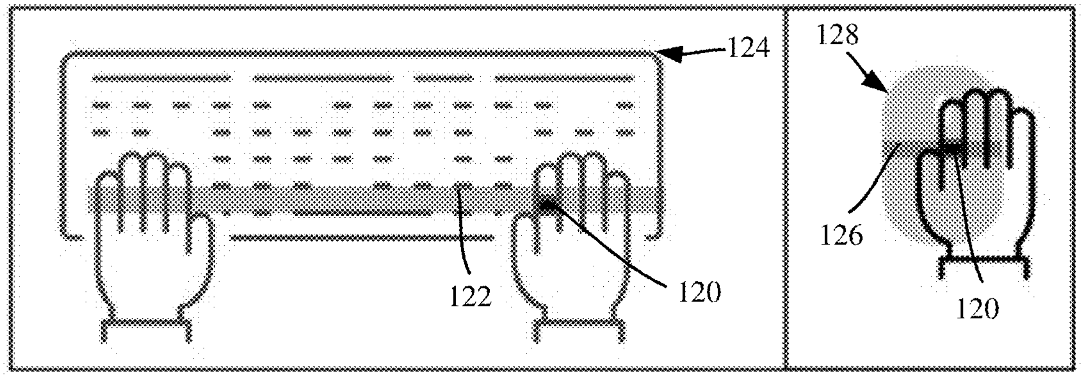
FIG. 1B is a representation of example computer peripheral devices (keyboard and/or mouse that includes a transceiver for communicating with a metasurface, in accordance with various example embodiments and implementations of the subject disclosure.
Figure 2:
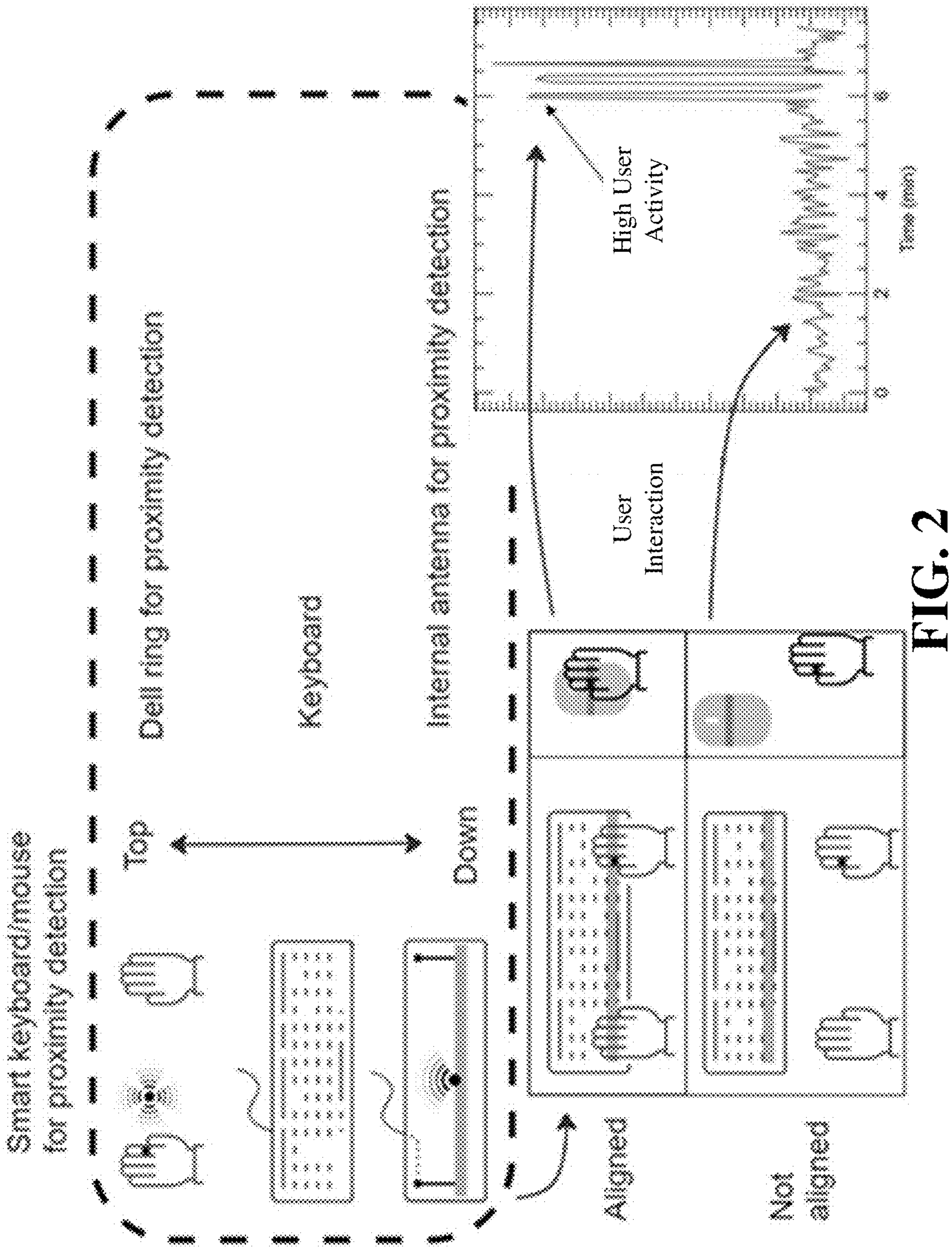
FIG. 2 is a representation of an example wearable device in the form of a ring design, in which the wearable device detects user interaction activity data, in accordance with various example embodiments and implementations of the subject disclosure.

FIGS. 1B and 2 show the general concept of a wearable ring 120 with a metasurface interacting with a peripheral device 124 or 128. The ring-based wearable metasurface 120 can act as a key to lock and unlock a computer, for example, or at least detect the user's presence to wake the computer, such as to automatically open present an interactive lock screen when proximity is detected.

More particularly, FIG. 1B shows the concept of an example ring 120 with a metasurface that couples to a transceiver/antenna 122 incorporated into a keyboard 124. Alternatively, or in addition to the transceiver/antenna 122 incorporated into the keyboard 124, a transceiver/antenna 126 can be incorporated into a mouse 128 or other pointing device.

FIG. 2 shows ways in which the transceiver (with antennas) can be embedded into computing device peripherals like a keyboard and a mouse. For users wearing a metasurface on a ring, hand movements, key presses, and mouse actions can be captured, for model training and subsequent analysis. The transceiver's antenna sends monitoring signals, which are reflected by the metasurface on the ring and registered by the system. The transceiver can be designed to be a native part of the device peripherals, ensuring seamless interaction and monitoring.

To summarize, the operation is based on having a receiver coupled to or incorporated into a computing device, e.g., as a native part of the computing device, or as an auxiliary USB or added card coupled to the computing device. A transmitter, which can be a transceiver that also receives the signal, transmits a wireless scanning signal, which in the presence of the metasurface is reflected back to the receiver, whereby the presence of the metasurface (and thus the user wearing the metasurface) is detected. In one implementation, the use of sub-terahertz range communication ensures that the metasurface remains compact, and that the system only detects the metasurface when the metasurface is in close proximity to the computing device, preventing unauthorized access from a distance. The wearable metasurface ring thus has the potential to act as a replacement for existing user authentication processes and as an aid to enhance current systems, e.g., offering a seamless and secure method for authentication that can be more convenient and less obtrusive than traditional methods like passwords, PINs, or biometric scans.

While a dedicated transceiver is one practical and convenient example, it should be noted that the transmitter and the receiver can be separate components. For example, consider an office setting where a single wall-mounted transmitter can transmit signals to multiple user work locations. Each user can share the same transmitter, yet have his or her own passive wearable device that reflects from the transmitter to a receiver. The users'respective computing devices can have respective external or internal receivers.

Figure 3A:
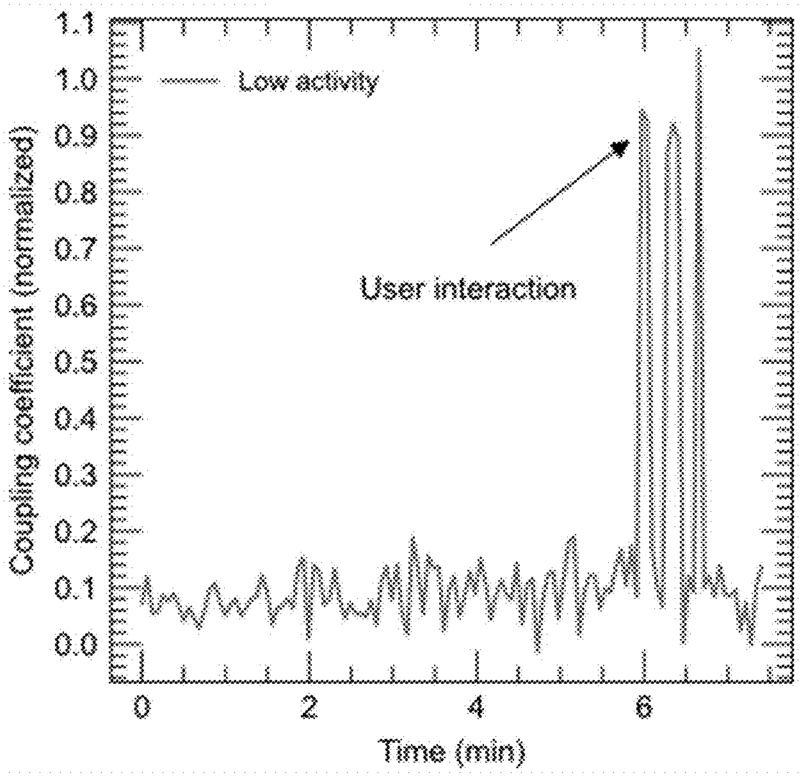
FIGS. 3A and 3B are graphical representations of normalized hardware output for low user interaction activity and high user interaction activity, respectively, with respect to computing device peripheral interaction detected over similar timeframes, in accordance with various example embodiments and implementations of the subject disclosure.
Figure 3B:
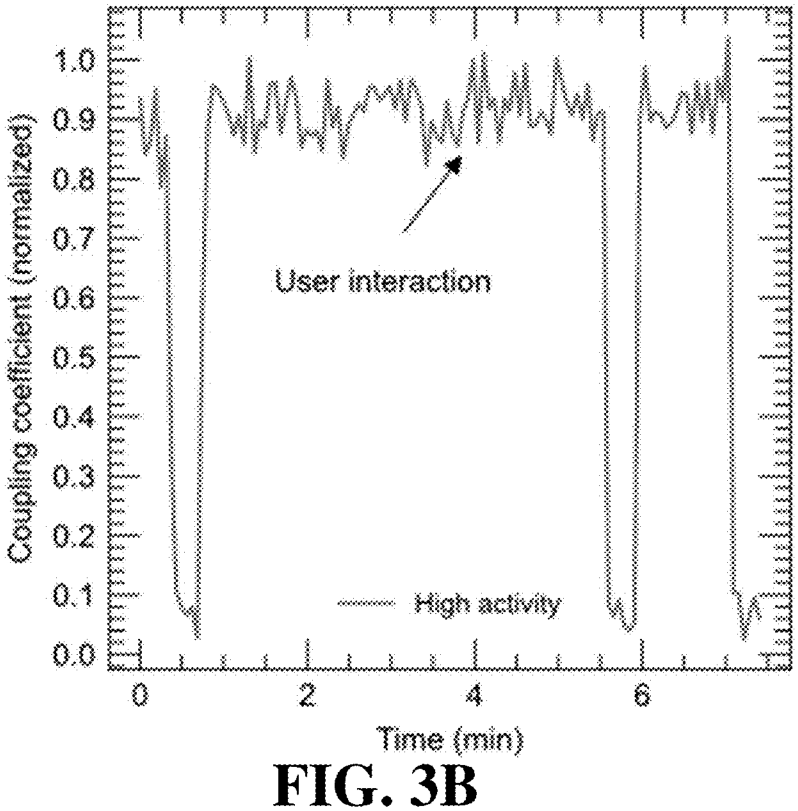

FIGS. 3A and 3B demonstrate user interaction with a computing device via a peripheral device over two different time periods, each 7.5 minutes long. A coupling coefficient representative of normalized hardware output is used to measure activity; a low coupling coefficient indicates inactivity or little interaction activity, while a higher coupling coefficient signifies more interaction activity. FIG. 3A illustrates a lesser minimal activity period, and FIG. 3B depicts a greater activity period. A clear differentiation between the on/off state of user interaction is observable within each total of 7.5 minutes; the active time can be interpreted as time for user interaction with the computing device.

Keystroke dynamics studies have shown that individuals have distinct typing rhythms and patterns that can be used to uniquely identify them. Factors such as typing speed, dwell time (the time a key is pressed), and flight time (the time between releasing one key and pressing the next) can be analyzed to create a unique profile for each user. Similar to keystroke dynamics, mouse dynamics involve studying the way a user moves and clicks their mouse. Characteristics such as speed, movement direction, click frequency, and drag-and-drop actions are generally unique to each person at a specific computing device work setup, which can be used to distinguish between users and even the same user in a different work setup with high accuracy.

Figure 4:
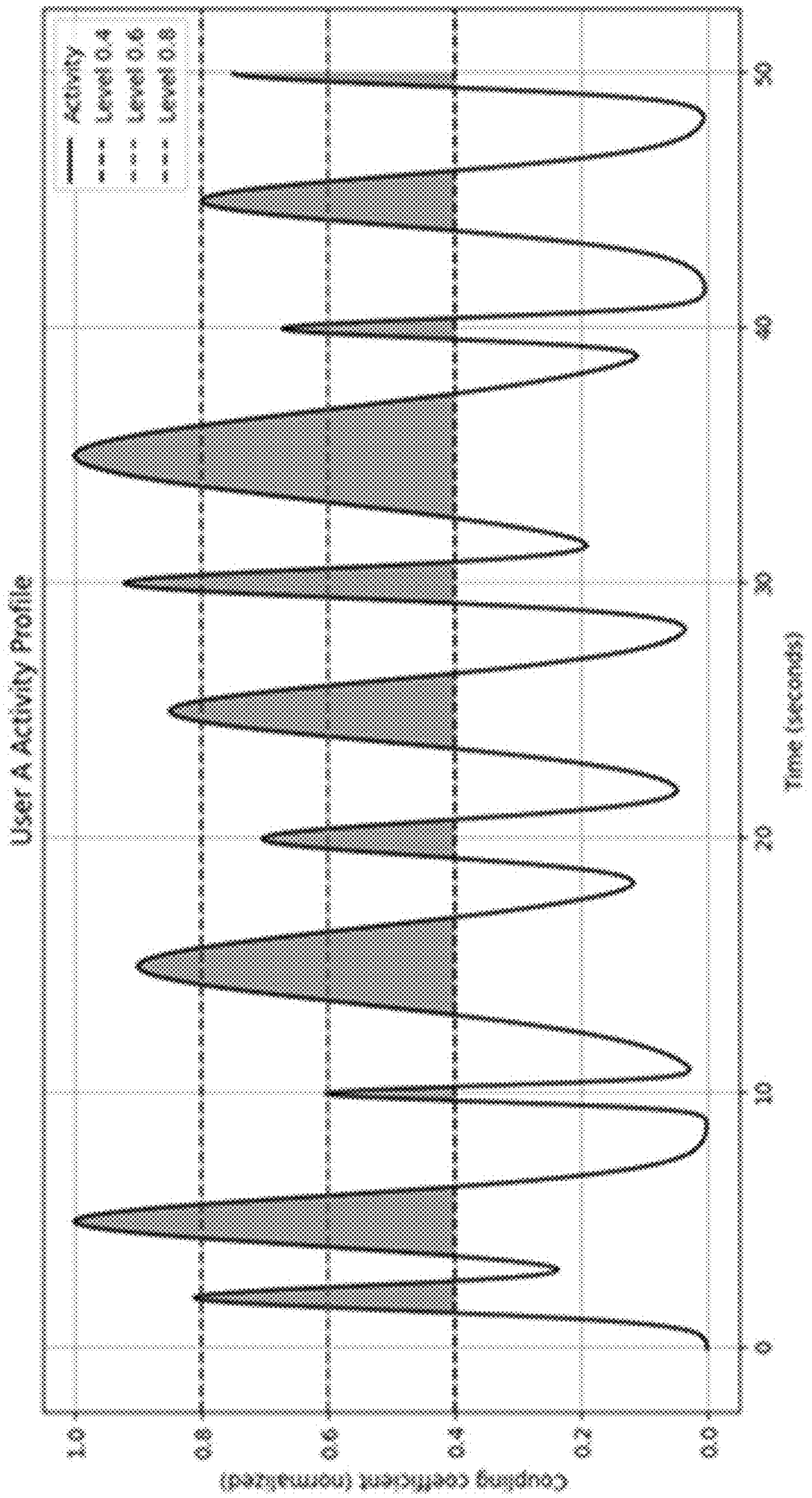
FIGS. 4, 5 and 6 are graphical representations of example user interaction activity pattern data (activity profile data showing coupling coefficient variation over time) for a first user (User-A), respectively showing three different levels of threshold filtering, in accordance with various example embodiments and implementations of the subject disclosure.
Figure 5:
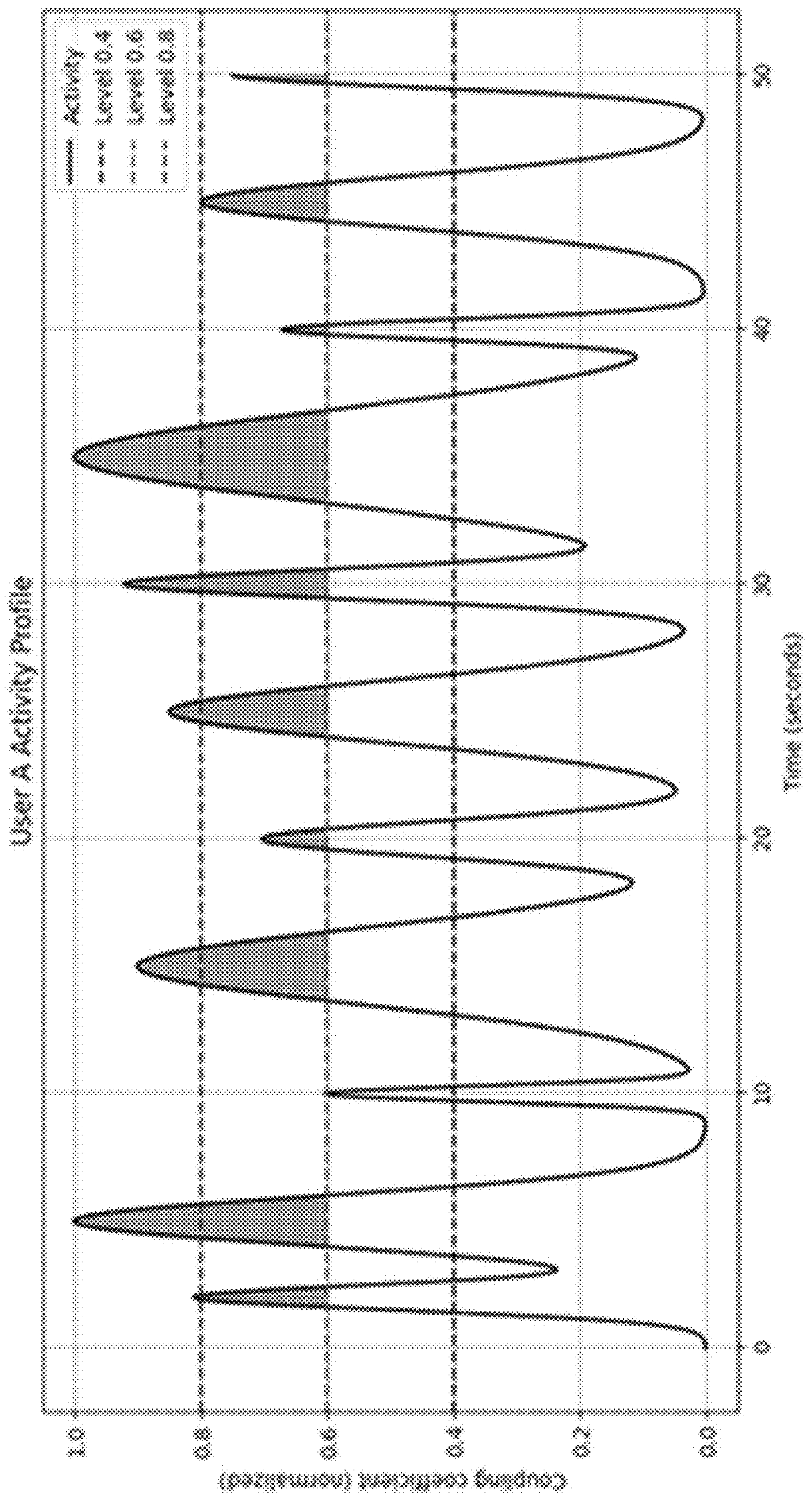
Figure 6:
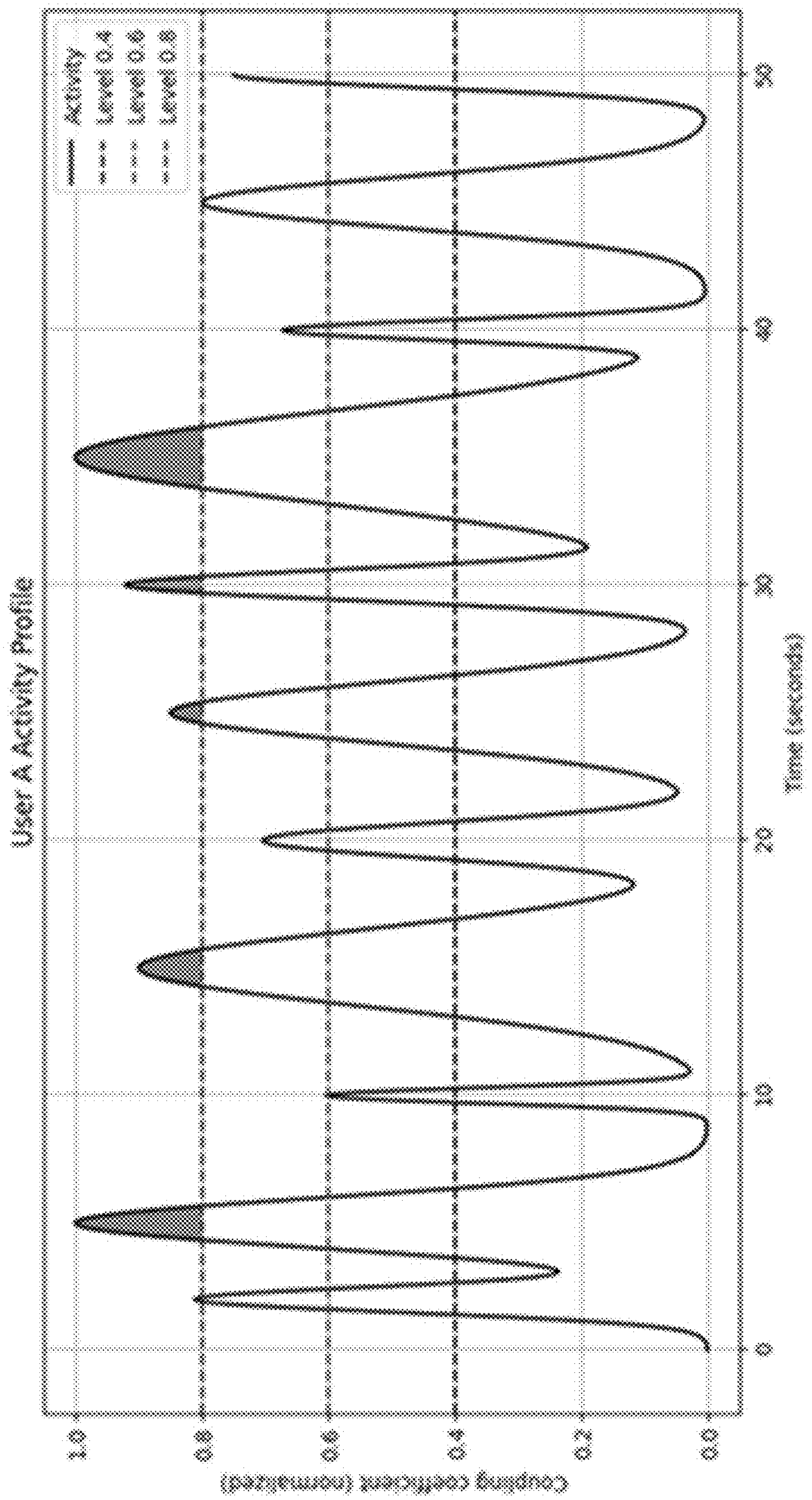

FIGS. 4-15B highlight the keyboard behaviors for three different users, showing examples of three different users'interaction patterns, in which the signals received by the transceiver are detected over a time window of fifty seconds. FIGS. 4-6 show the dataset of activity profile of a first user, User A, with respect to satisfying different threshold levels (namely forty percent, sixty percent, and eighty percent, respectively, for this example user). More particularly, in FIG. 4 the shaded areas highlight the periods where the coupling coefficient exceeds a threshold level of 0.4, in FIG. 5 the shaded areas highlight the periods where the coupling coefficient exceeds a threshold level of 0.6 and in FIG. 6 the shaded areas highlight the periods where the coupling coefficient exceeds a threshold level of 0.8.

Threshold filtering can be used instead of using the complete dataset for learning and analysis. Some benefits of this approach include that by setting a threshold, less significant data is filtered out, focusing only on more meaningful events where user activity peaks. This significantly reduces the amount of data that needs to be processed, stored, and analyzed, leading to lower computational and memory requirements. Processing only the most relevant data allows the system to operate more efficiently; the lesser amount of data means the trained model(s) can analyze user behavior patterns more quickly, leading to faster decision-making and real-time responses. Still further, threshold filtering helps in reducing or eliminating background noise and reducing or eliminating irrelevant fluctuations in the data, resulting in cleaner datasets that can improve the accuracy of AI models.

Considerations when implementing threshold filtering include setting the threshold level, as too high may result in too small of a dataset, whereas too low may provide a lot of meaningless or outlier data. Setting the appropriate threshold level is based on understanding the typical range of user activity data and identifying the points that represent meaningful actions.

The threshold level may need to be dynamically adjusted based on evolving user behavior or environmental factors like the user's location. Adaptive thresholding techniques can be employed to automatically adjust the threshold level in real-time. Some level of access also can be provided to the user for locations and environments not necessarily known to the system; e.g., the user can set a lower threshold for more interaction tracking when in an insecure environment (even at an otherwise secure location such as home, but while hosting a large gathering such that the computing device cannot be supervised), and can set a higher threshold when alone and/or a trusted location.

The system needs to balance between load reduction and data quality, that is, the system needs to set the threshold level such that the threshold filtering process does not discard the significant data, validating as needed that the filtered data still represents the user's behavior accurately and comprehensively. Thus, while threshold filtering reduces computational load, a balance needs to be maintained so that the quality of data for training AI models is not compromised.

Figure 7A:
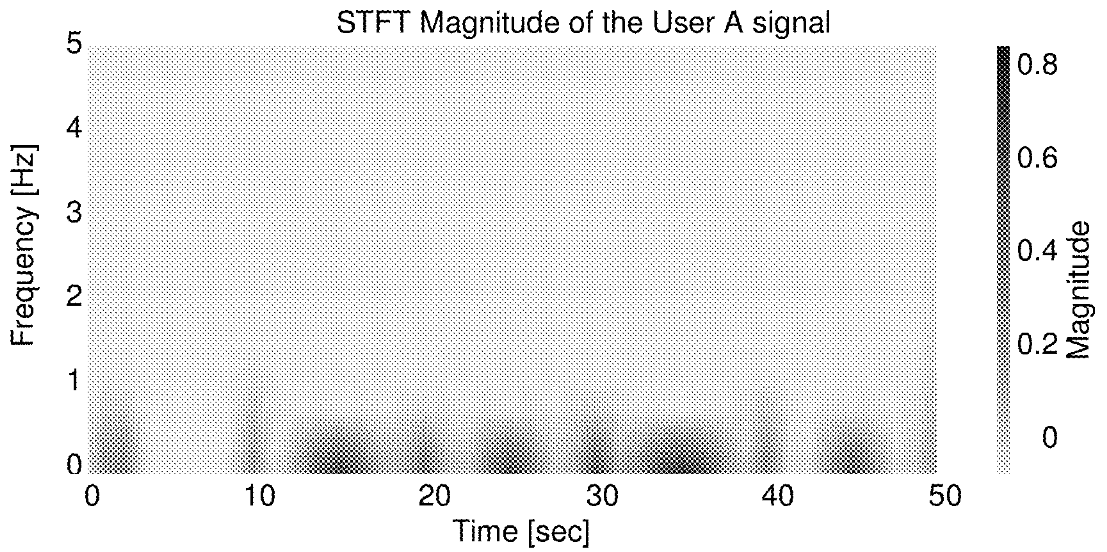
FIGS. 7A and 7B are example representations of frequency domain analysis for the first user (User-A), showing a short-time Fourier transform (STFT) spectrogram and wavelet transform spectrogram, respectively, in accordance with various example embodiments and implementations of the subject disclosure.

A spectrogram of user A's activity created using the short-time Fourier transform (STFT) is shown in FIG. 7A. This spectrogram shows the distribution of signal energy across different frequencies over time. By adding a frequency dimension to the analysis, the captured data reveals how the signal's frequency content changes over time. The dark spots (nearer the lower frequencies) indicate periods when the signal has high energy at specific frequencies, indicating user activity. Notably, lower frequencies show more energy, suggesting that user activity primarily affects these lower frequencies. This additional frequency-based information enhances the analysis by providing valuable insights for more advanced signal processing and feature extraction for AI/ML models.

Figure 7B:
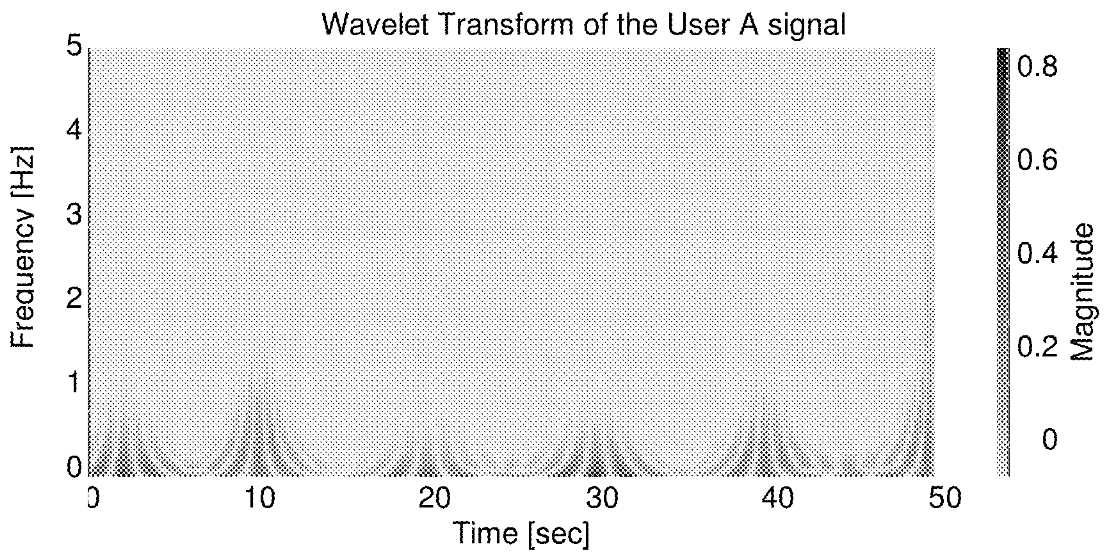

FIG. 7B shows a spectrogram generated using a wavelet transform, which provides a detailed energy distribution of the signal across time and frequency useful for domain analysis. Unlike the STFT shown in FIG. 7A, which uses a fixed window size, the wavelet transform adapts to both continuous and transient features in the signal. This adaptive approach offers a more nuanced view of user interactions. For AI models, the wavelet transform is particularly useful as it helps identify unusual activities or user behaviors by examining deviations from typical patterns, which may require further investigation or additional authentication steps.

Figure 8:
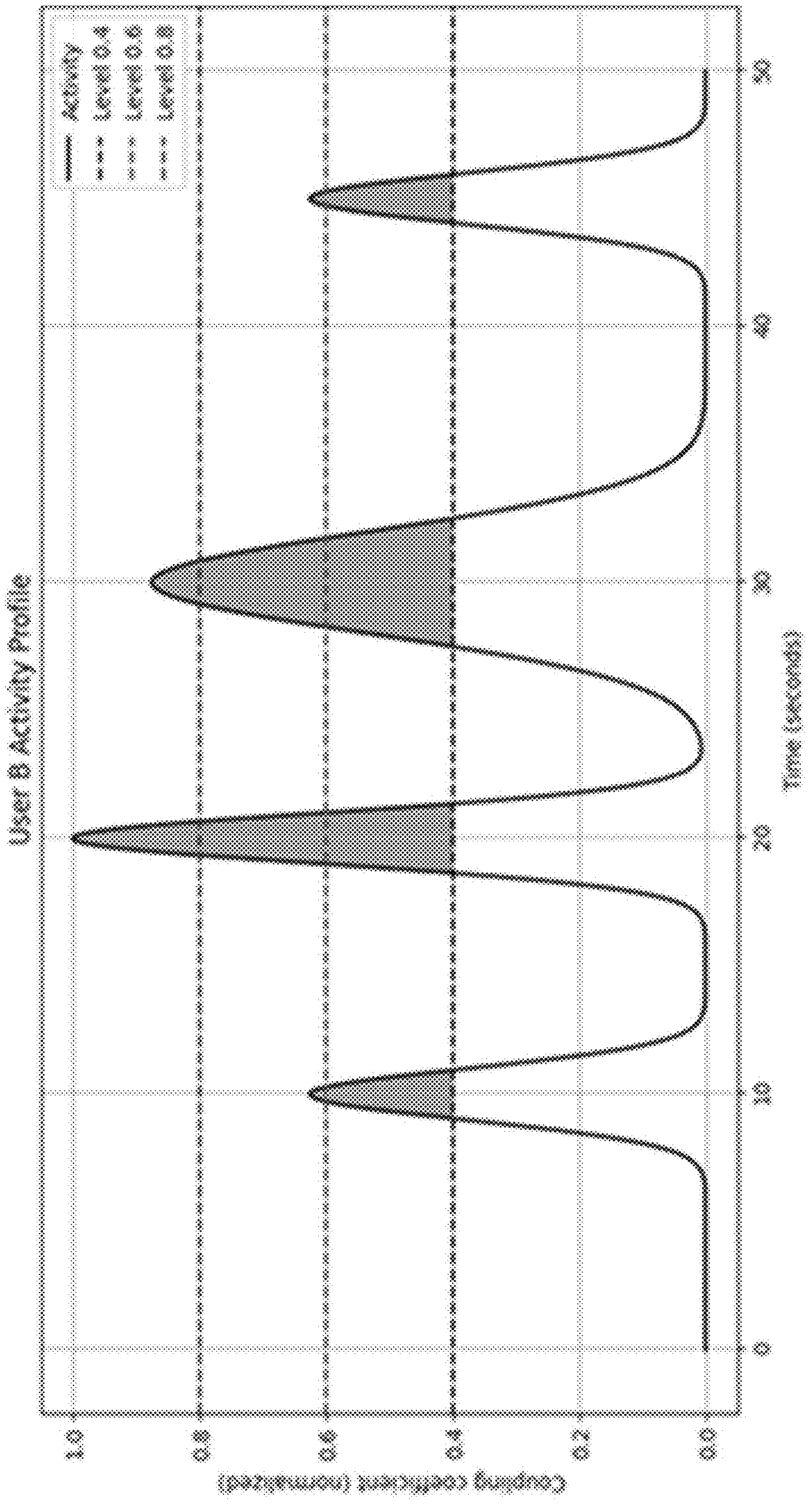
FIGS. 8, 9 and 10 are graphical representations of example user interaction activity pattern data (activity profile data showing coupling coefficient variation over time) for a second user (User-B), respectively showing three different levels of threshold filtering, in accordance with various example embodiments and implementations of the subject disclosure.
Figure 9:
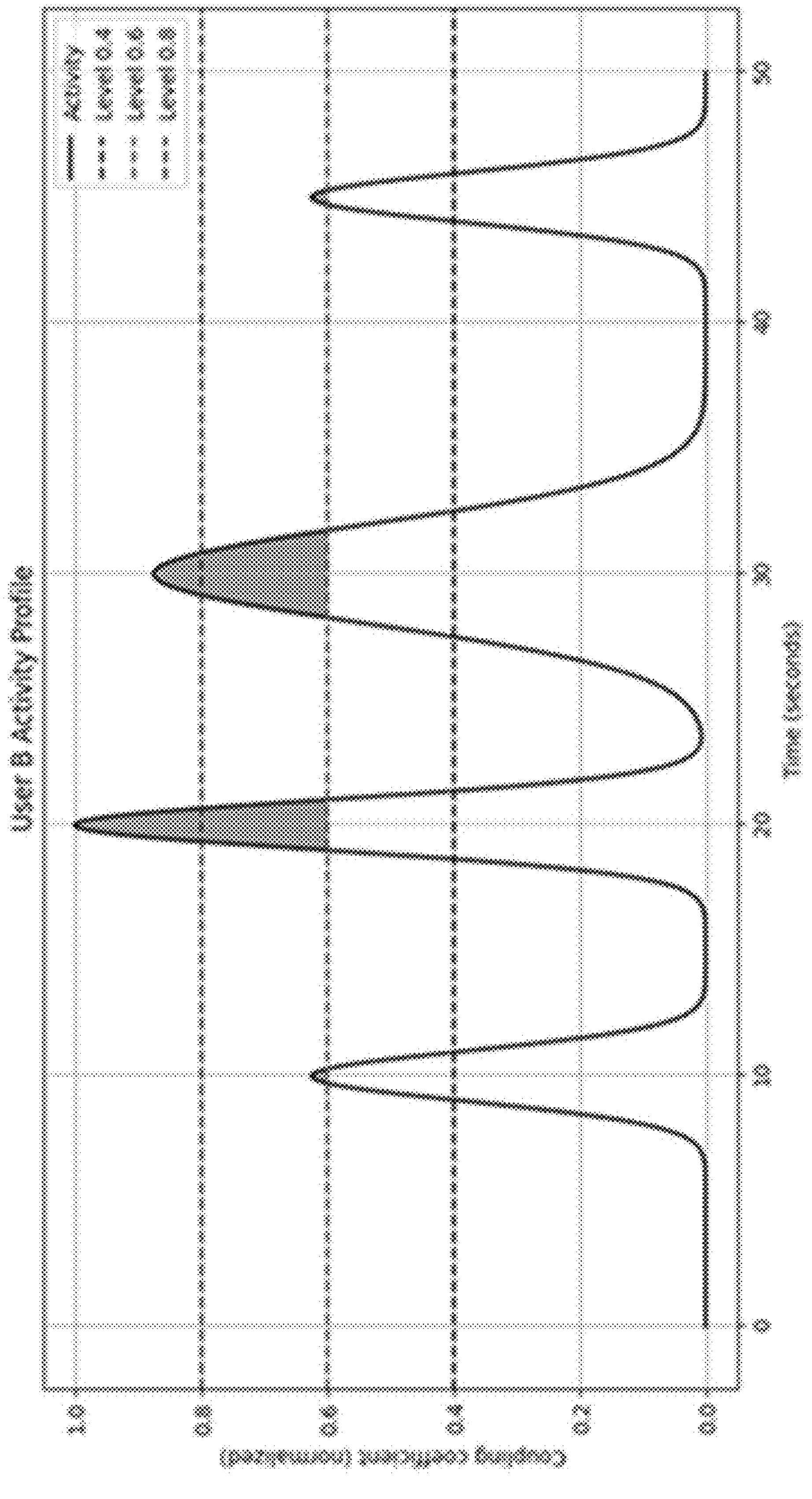
Figure 10:
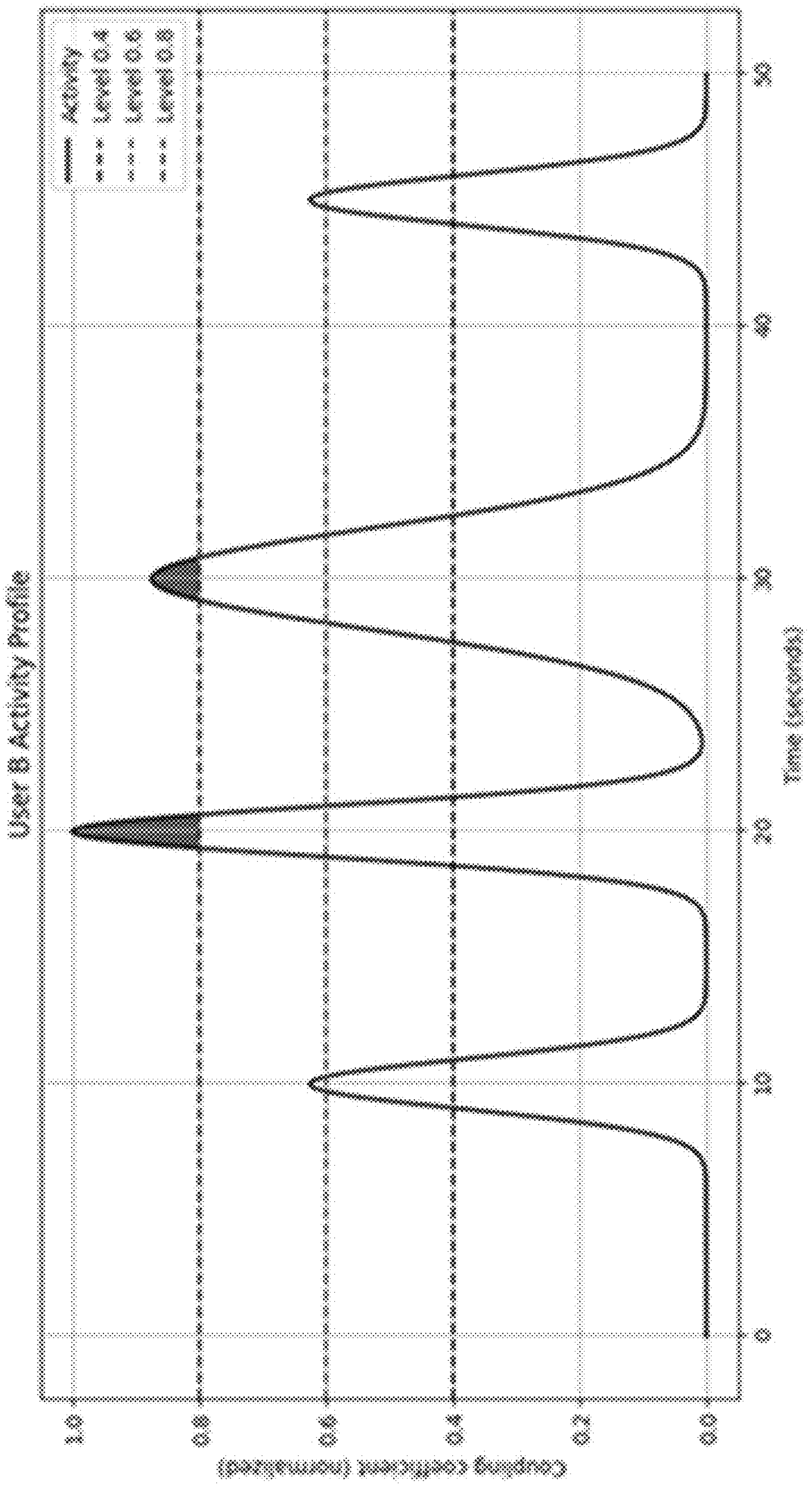
Figure 11A:
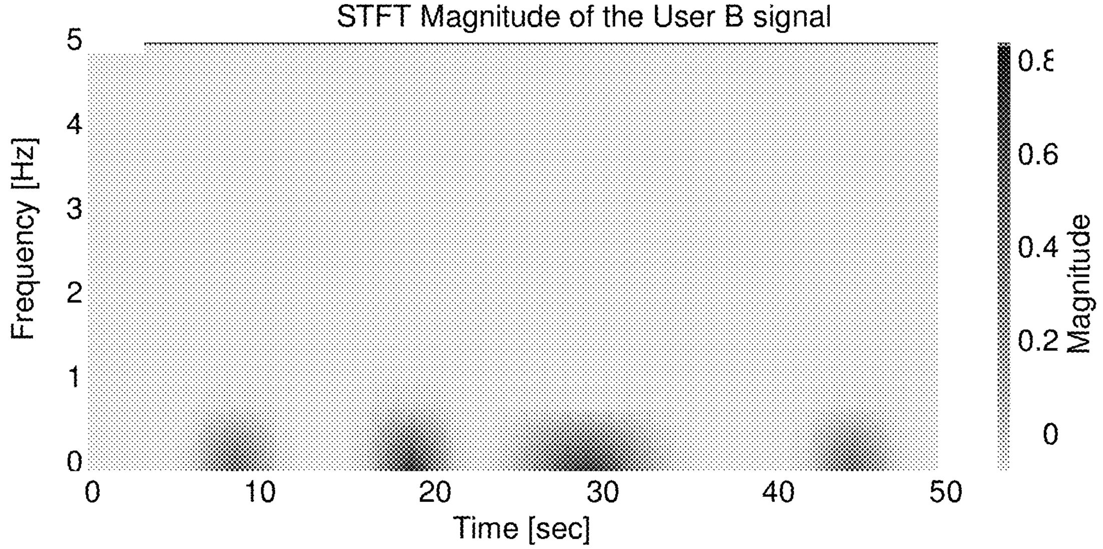
FIGS. 11A and 11B are example representations of frequency domain analysis for the second user (User-B), showing a short-time Fourier transform (STFT) spectrogram and wavelet transform spectrogram, respectively, in accordance with various example embodiments and implementations of the subject disclosure.
Figure 11B:
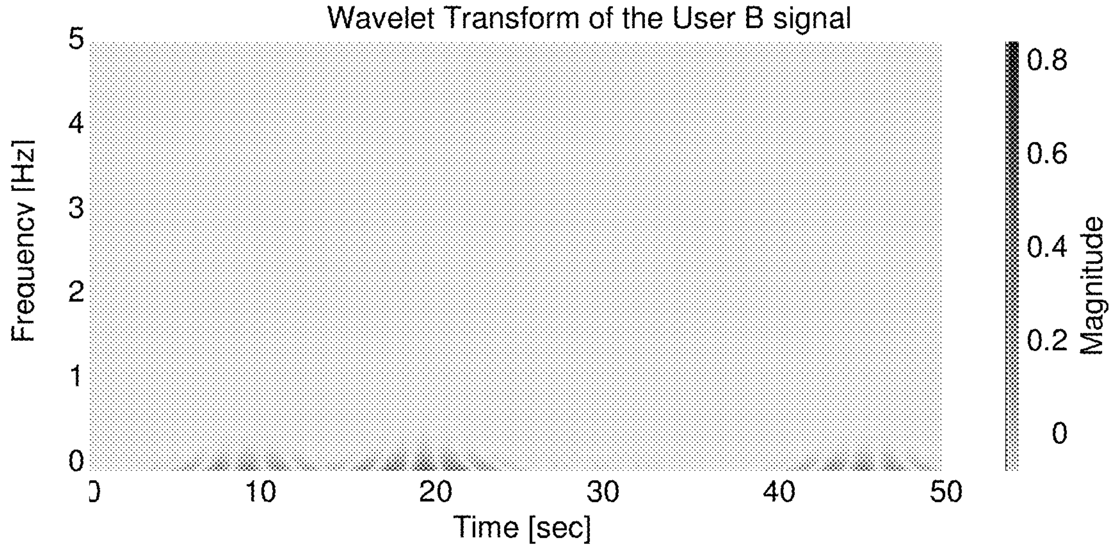
Figure 12:
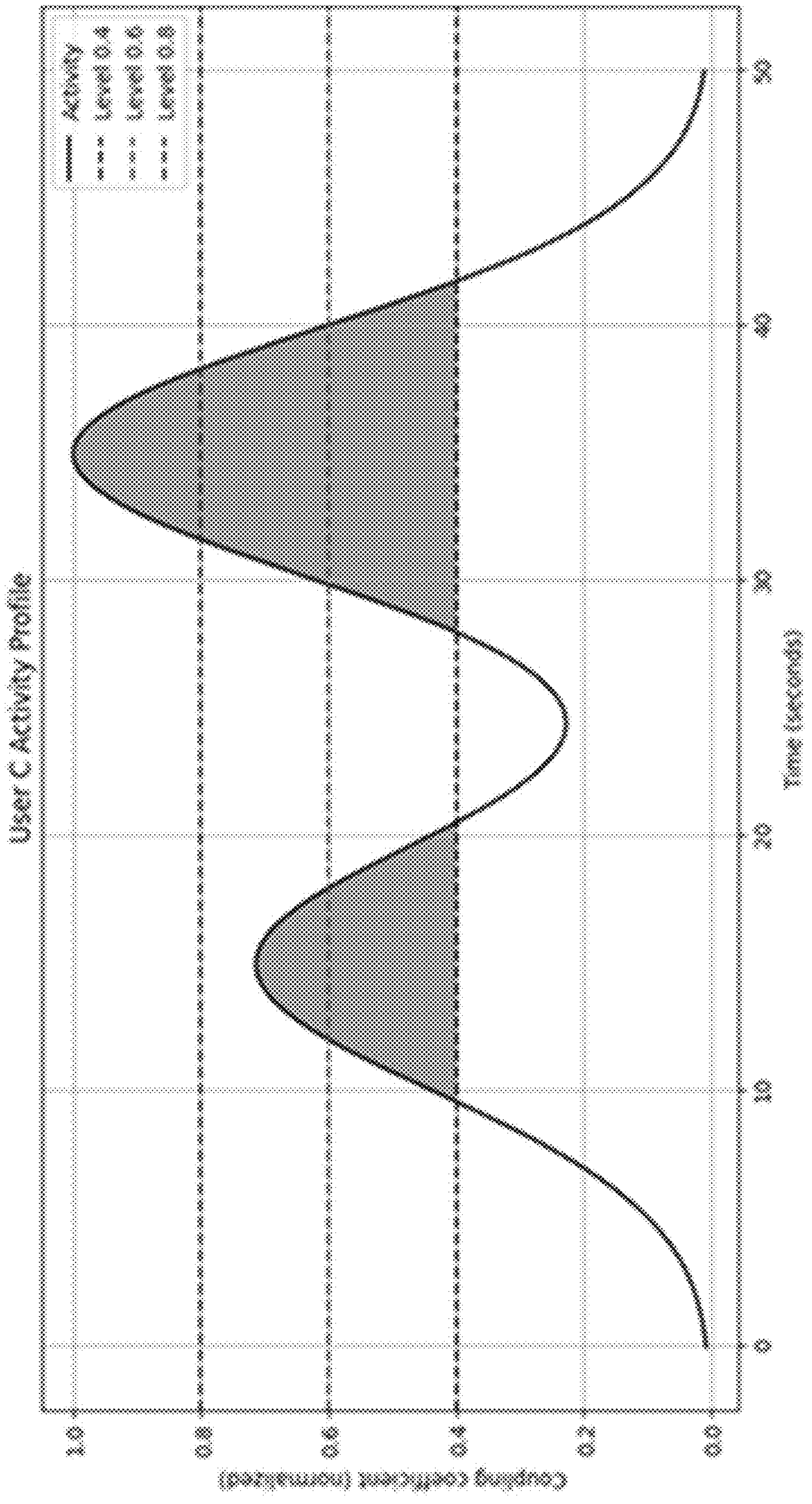
FIGS. 12, 13 and 14 are graphical representations of example user interaction activity pattern data (activity profile data showing coupling coefficient variation over time) for a third user (User-C), respectively showing three different levels of threshold filtering, in accordance with various example embodiments and implementations of the subject disclosure.
Figure 13:
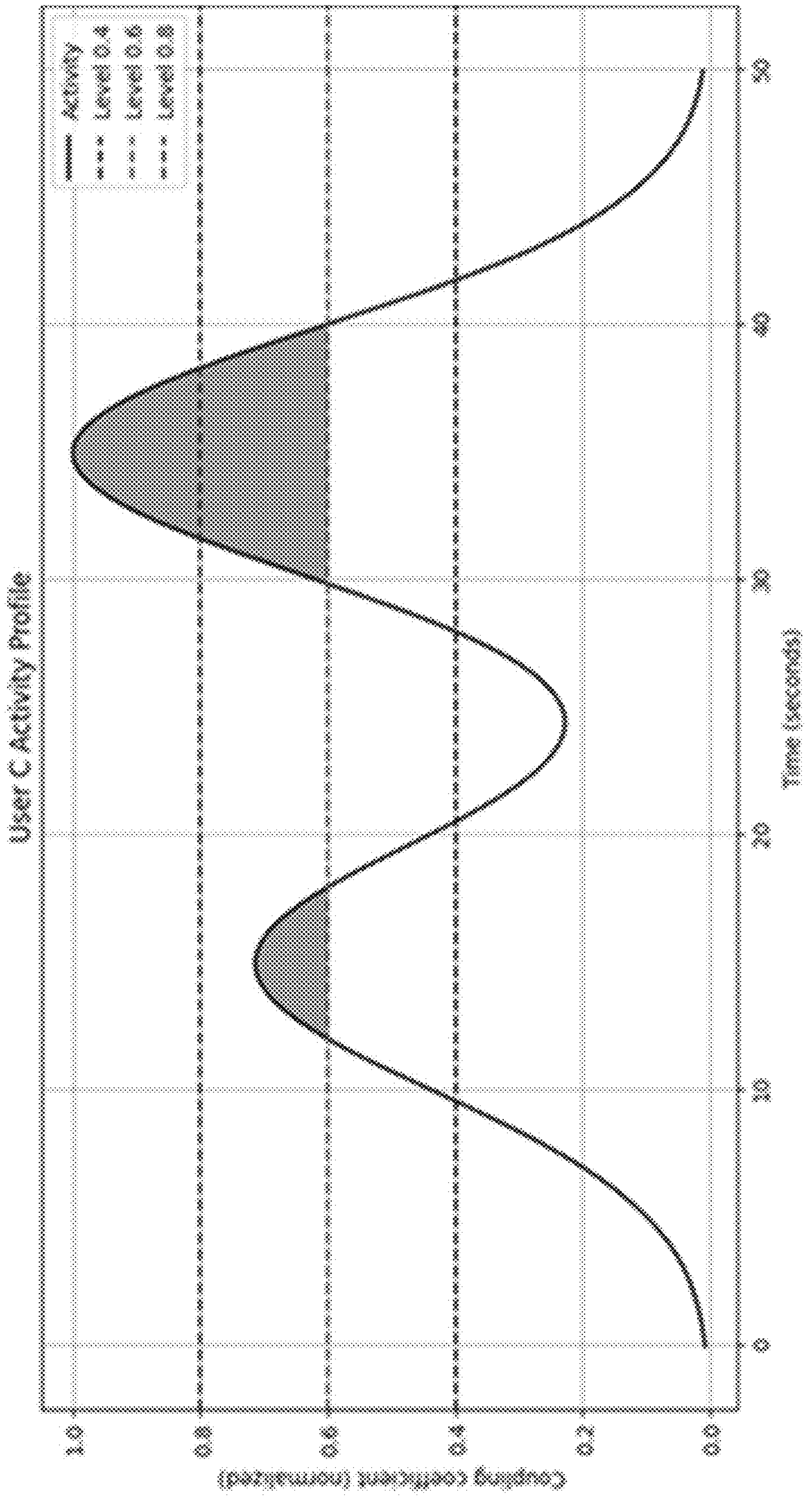
Figure 14:
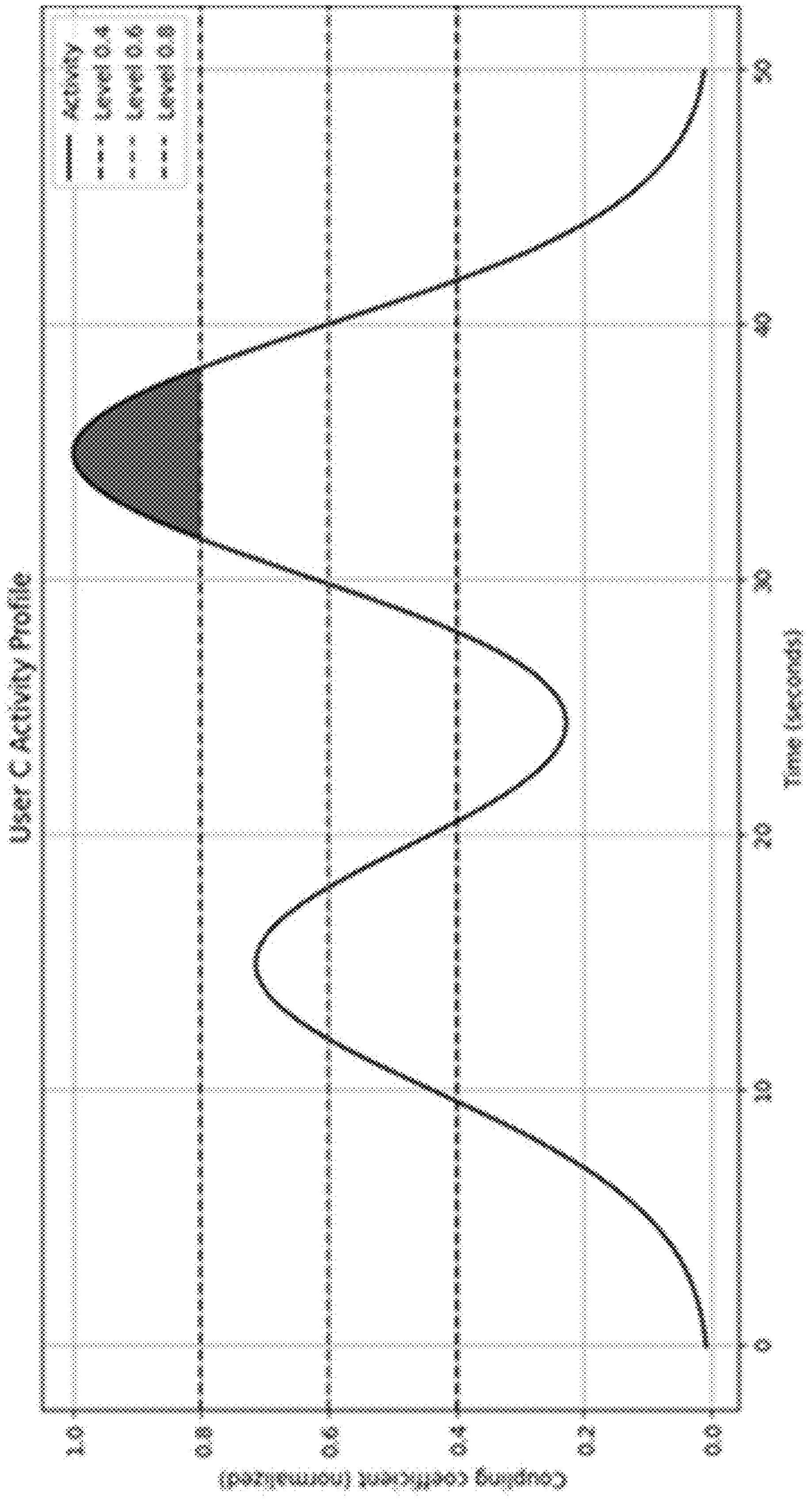
Figure 15A:
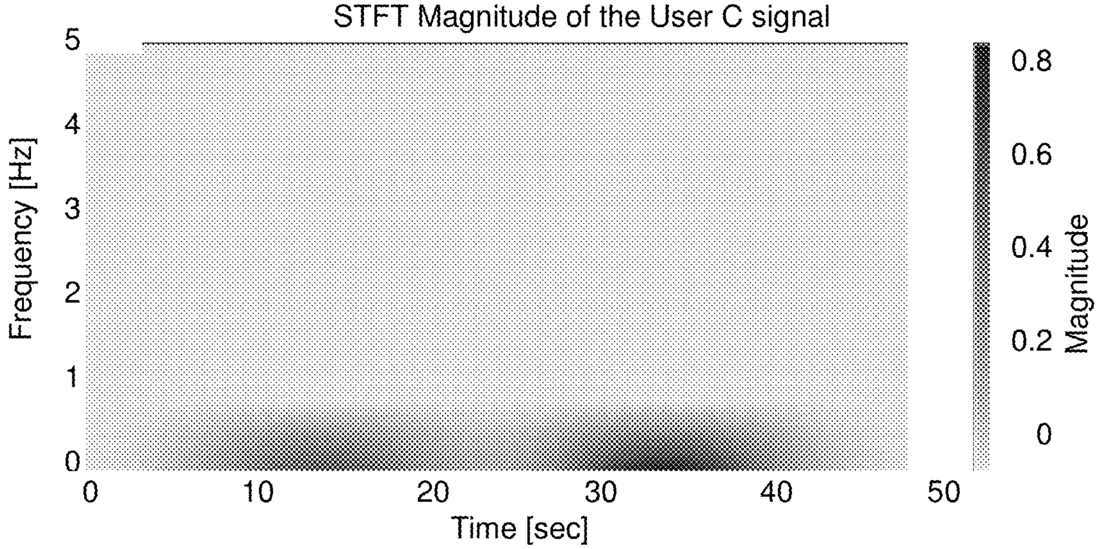
FIGS. 15A and 15B are example representations of frequency domain analysis for the third user (User-C) activity profile, showing a short-time Fourier transform (STFT) spectrogram and wavelet transform spectrogram, respectively, in accordance with various example embodiments and implementations of the subject disclosure.
Figure 15B:
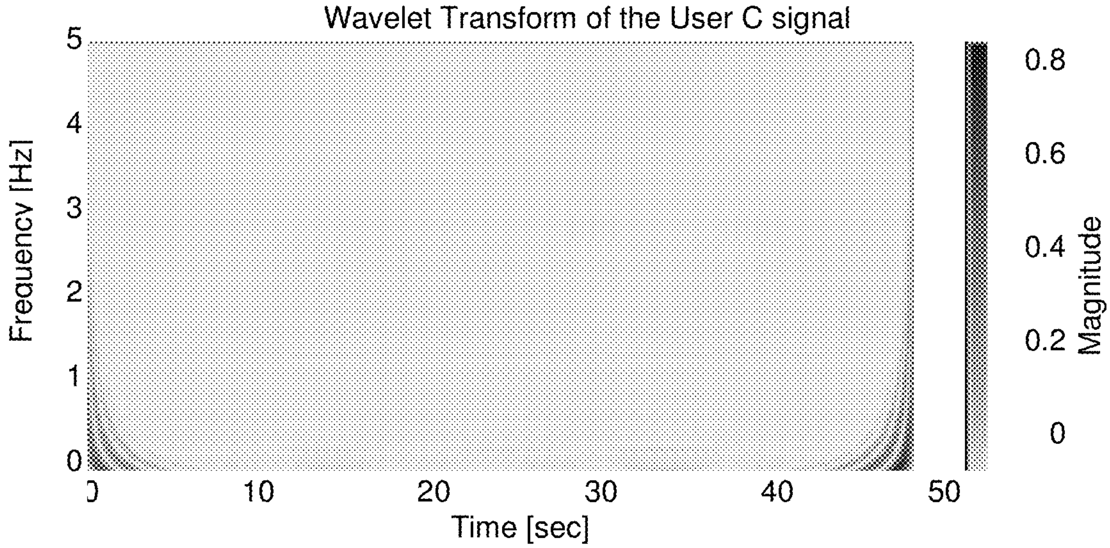

For a comparison with the analysis of User-A, FIGS. 8-10, are 2D plots of a second user, User B, showing User-B's activity, capturing variations in coupling coefficient over a fifty second time window for the same three levels of threshold filtering. FIGS. 11A and 11B depict User-B's activity in STFT and wavelet transform spectrograms, respectively. For another comparison with the analyses of User-A and User-B, FIGS. 12-14, are 2D plots of a third user, User C, showing User-C's activity, capturing variations in coupling coefficient over a fifty second time window for the same three levels of threshold filtering. FIGS. 11A and 11B depict User-C's activity in STFT and wavelet transform spectrograms, respectively. By comparing the activity profiles of Users A, B, and C, it can be observed that each user exhibits distinct interaction patterns, which can be used to personalize and enhance user authentication and behavior analysis systems.

Figure 16:
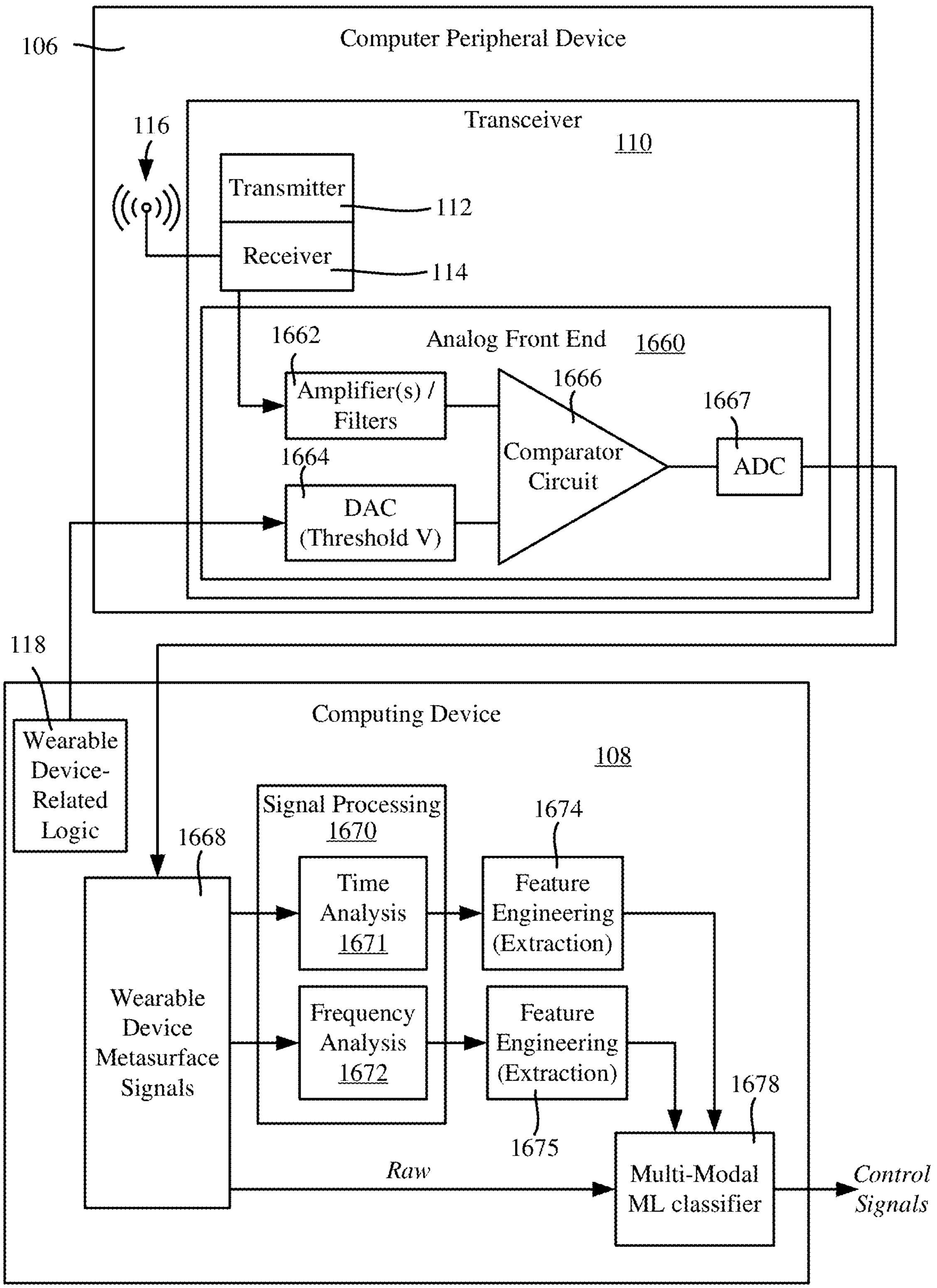
FIG. 16 is a block diagram representation of a signal processing workflow for user activity data acquired from a wearable device with a metasurface, in accordance with various example embodiments and implementations of the subject disclosure.
Figure 17:
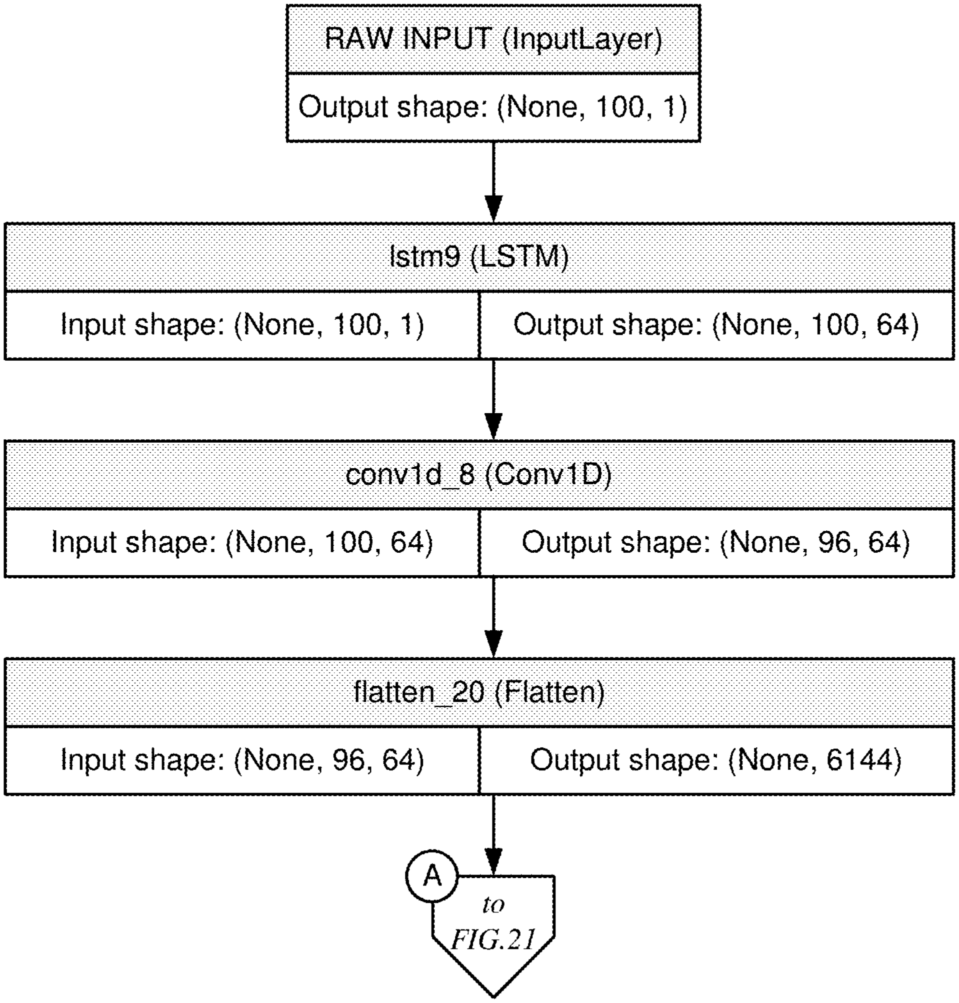
FIGS. 17, 18, 19, 20 and 21 comprise a representation of a multi-modal machine learning (ML) classifier architecture, in accordance with various example embodiments and implementations of the subject disclosure.
Figure 18:
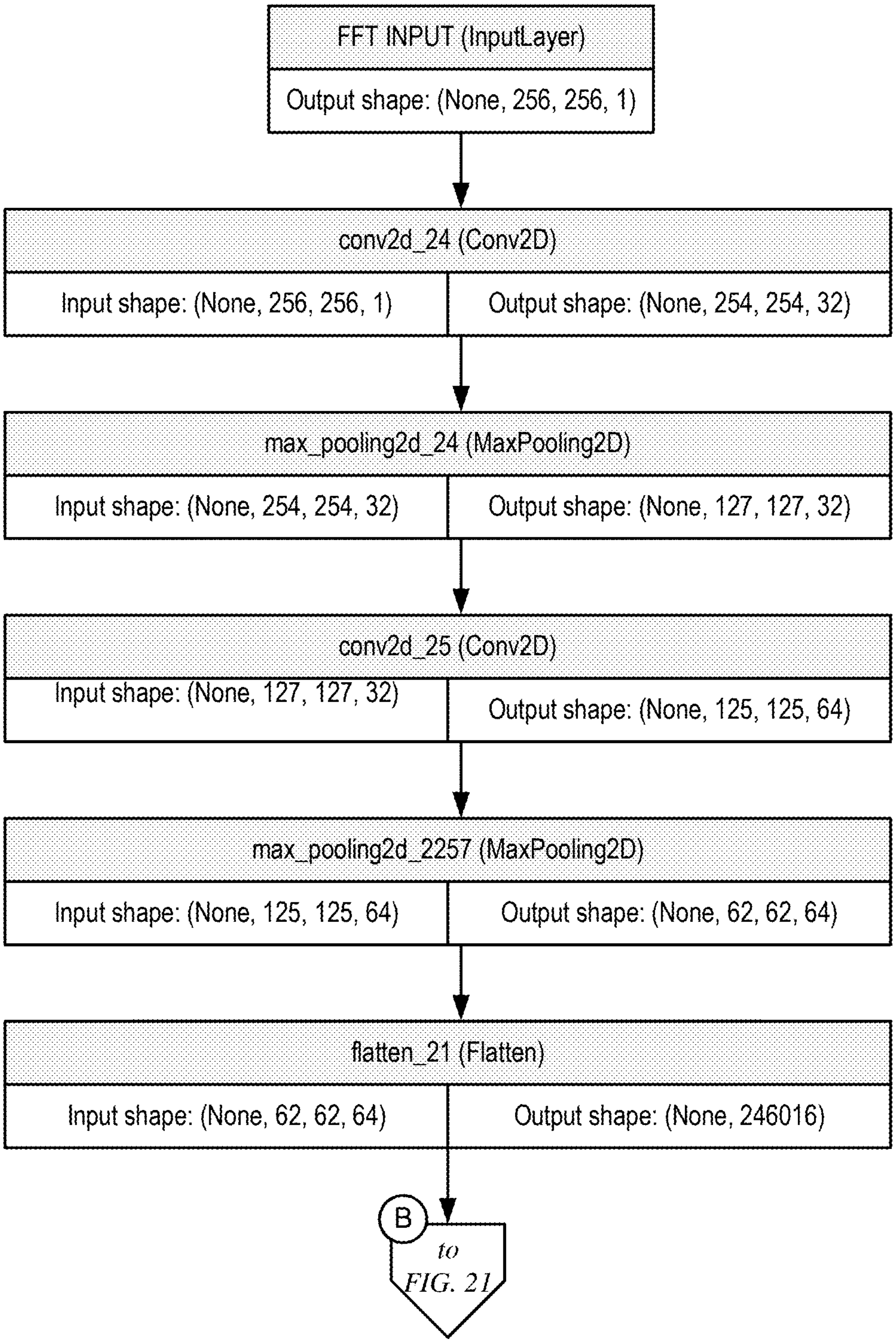
Figure 19:
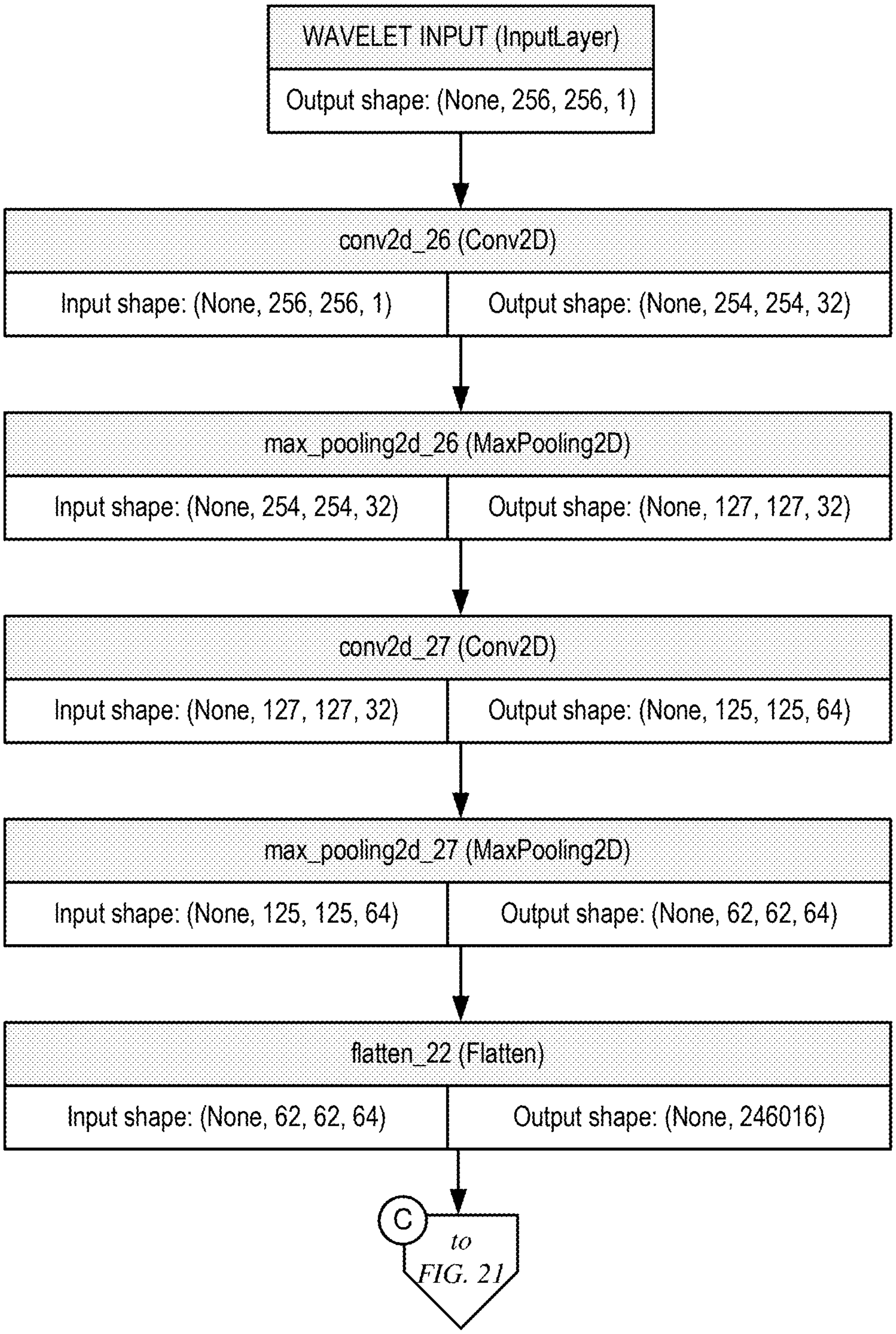
Figure 20:
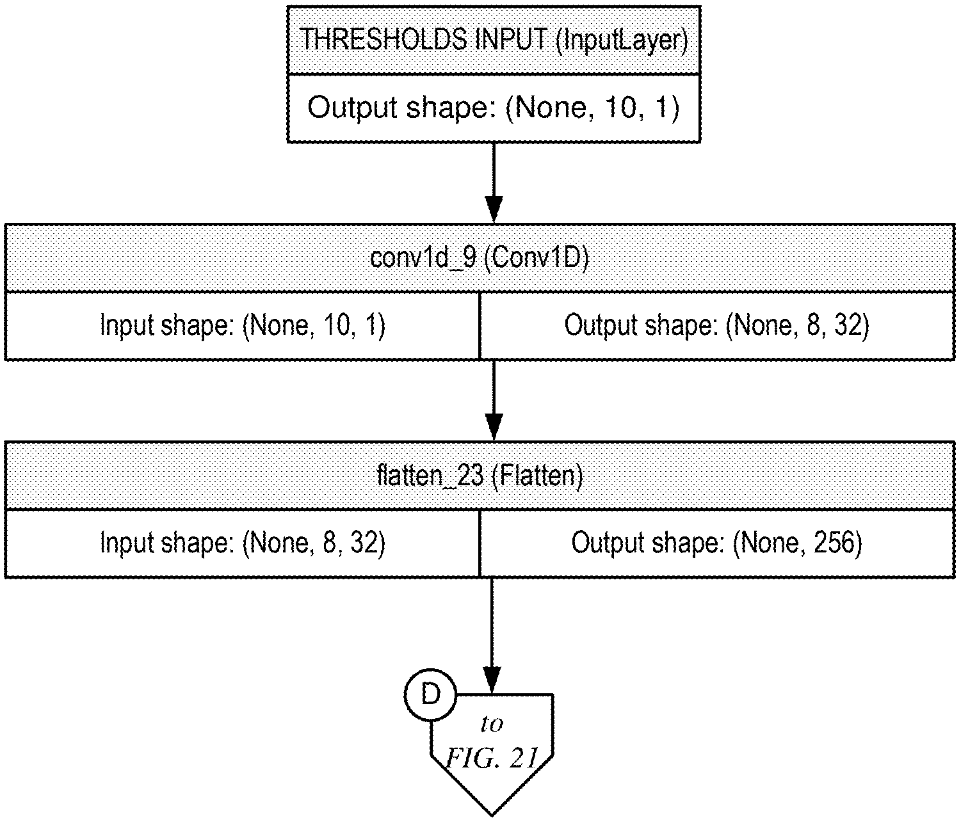

Additional example hardware implementation details are shown in FIG. 16. As described with reference to FIG. 1A, the transceiver 110 in the computer peripheral device 106 (e.g., keyboard) sends and receives signals via an antenna 116 that emits monitoring signals (transmitter block 112). The metasurface, e.g., incorporated into the ring on the user's hand, reflects the signals, and the antenna 116 and receiver (block 114) captures the reflected signals from the metasurface. As described herein, these reflected signals vary based on the user's movements and interactions with the keyboard and/or mouse.

An analog front end 1660 in the transceiver 110 includes one or more amplifier(s)/filter(s) (block 1662), and analog-to-digital converter(s) (ADC) 1664. A comparator circuit 1666 is used to implement threshold detection. The comparator circuit 1666 compares the signal amplitude against a predefined threshold level. The threshold level is set using a digital-to-analog converter (DAC) 1667 that generates a reference voltage (e.g., as set by the wearable device-related logic 118 in the computing device 108). The reference voltage represents the threshold level. Data points that exceed the threshold are stored temporarily and transmitted to the system AI model for behavioral analysis. Hardware-based filtering allows for real-time processing and virtually immediate responses to significant user activities. Implementing threshold filtering in hardware reduces the power consumption compared to processing the data in software.

Because the system operates continuously, it is designed for low power consumption. Power management involves implementing sleep and wake modes to save power when the system is idle. The system can wake up and start processing when significant activity is detected.

FIG. 16 also shows the processing workflow and subsystems for analyzing user activity data from the metasurface based on the signals 1668 (based on those signals exceeding the threshold voltage) from the analog front end 1660, and includes a signal processing subsystem 1670 (time analysis 1671 and frequency analysis 1672), feature engineering (blocks 1674 and 1675), and the multi-modal machine learning (ML) classifier model 1678. The signal processing subsystem 1670 includes subjecting the raw data to time domain analysis and frequency domain analysis. This dual-domain approach ensures that transient and continuous features are considered for more accurate behavior modeling. Parallel processing can be used to allow the system to operate in real-time, providing virtually immediate feedback based on user activity. Feature engineering (blocks 1674 and 1675) in both time and frequency domains extract rich, informative features useful for a high-precision ML model. These features are fed into the multi-modal machine learning (ML) classifier 1678. The classifier model 1678 categorizes the user's activity and generates control signals for various purposes, such as user authentication and/or adaptive security measures. For instance, detecting unusual activity patterns can prompt additional authentication, or trigger security alerts, enhancing the overall security of the system.

FIGS. 17-21 represent one example multi-modal ML classifier architecture that is designed to enhance user authentication by integrating various data modalities, including raw signal data, fast Fourier transform (FFT) spectrum images, wavelet spectrum images, and threshold-based features. Each modality is processed through specific branches; the time series data is handled (FIG. 17) by a combination of long-short-term memory (LSTM) and 1D convolutional layers to extract temporal and localized features effectively. The FFT spectrum, now treated as an image, is processed (FIG. 18) through a sequence of 2D convolutional and pooling layers to capture spatial-frequency patterns. Similarly, the wavelet spectrum images are processed (FIG. 19) through another set of 2D convolutional and pooling layers.

Figure 21:
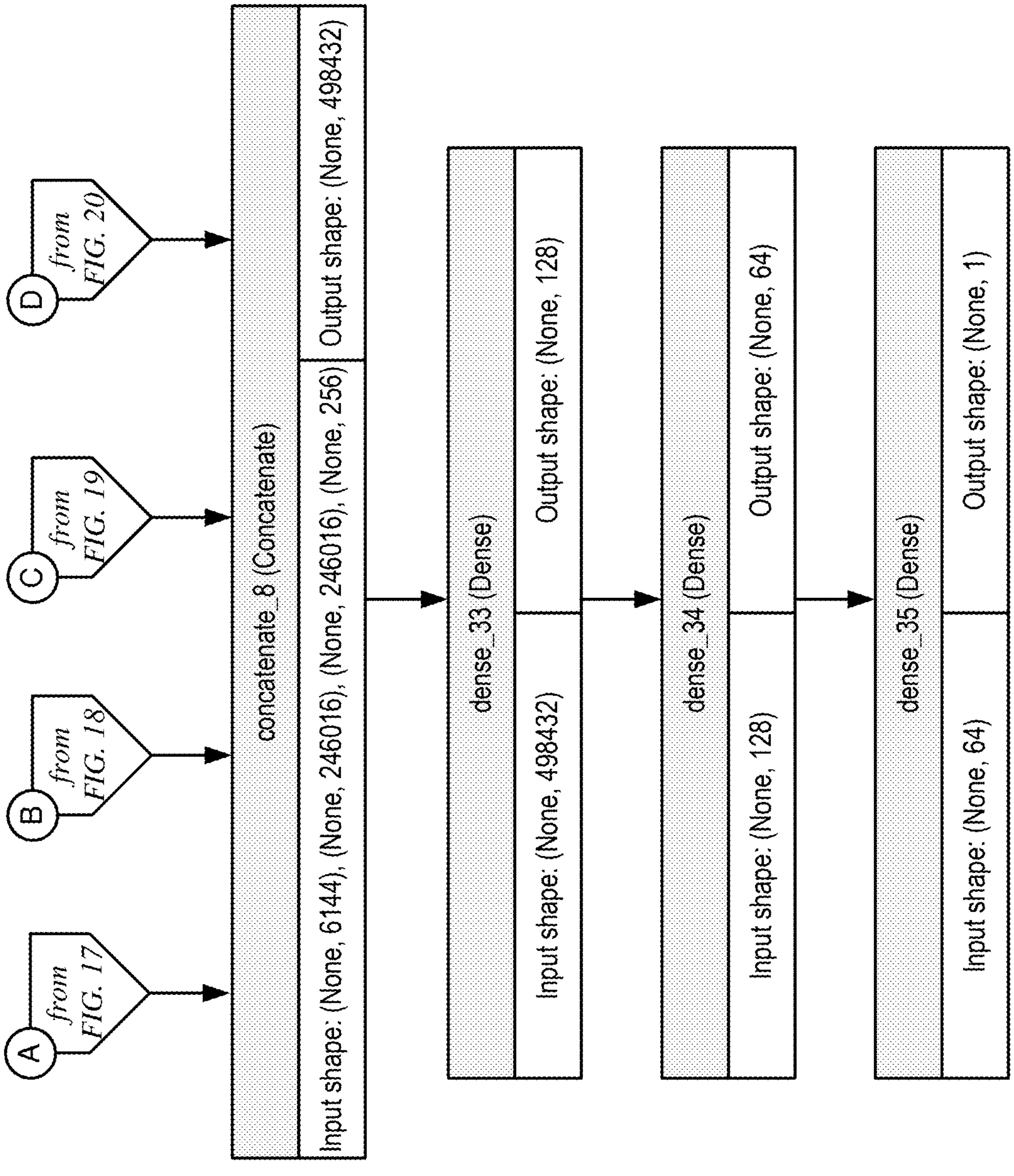

For the threshold-based features, a 1D convolutional approach (FIG. 20) is utilized to capture relationships within the data. As shown in FIG. 21, the outputs from these branches are then concatenated and fed through dense layers to integrate the extracted features, allowing the model to make informed authentication decisions based on a comprehensive analysis of all input types. This architecture leverages the strengths of each data type but also facilitates a deeper understanding of inter-modal dynamics, for improving the reliability and accuracy of the authentication process.

Figure 22:
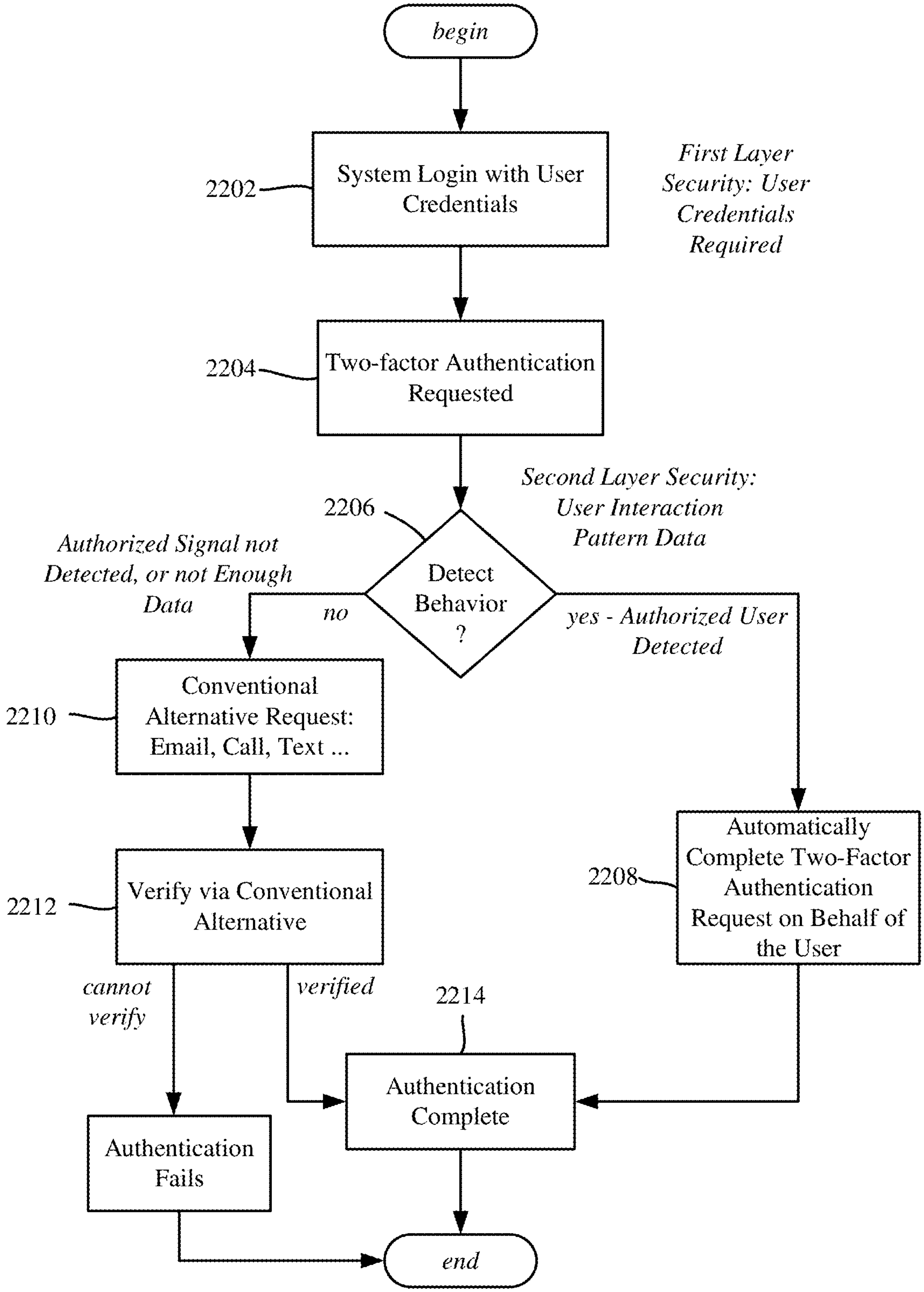
FIG. 22 is a flow diagram showing example operations related to obtaining authentication response data from a trained model set, based on user interaction pattern data, indicative of whether a user is authorized to use the computing device, in accordance with various example embodiments and implementations of the subject disclosure.

Turning to one usage example, namely multifactor authentication (two-factor authentication in this example), FIG. 22 shows example operations beginning at operation 2202 where a user logs into a system (e.g., a system such as a site/website) by entering valid user credentials. This is a first layer of security, as a login request with invalid credentials will be denied.

Operation 2204 represents receiving a two-factor authentication request as a second layer of security required to be satisfied to complete the login. If at operation 2206 the user's metasurface is detected, that is, the metasurface with a unique ID (service tag) matches the expected ID, the two-factor authentication request is automatically completed on behalf of the user at operation 2208, e.g., via local device software coupled to a backend service, and authentication is complete (operation 2214). Note that "complete" does not necessarily mean that the user does not still have to submit the code, but rather is intended to mean that the user does not need to take any manual data entry actions (e.g., look at the phone to see the number, then type the number to the input field on the computer) to obtain the two-factor authentication code. For example, the backend service can be an authenticator service, or a service that manages the metasurface coupled to an authenticator service, whereby the local device software receives the two-factor authentication code and populates the code into the input field of the request, which completes the request on behalf of the user. In the event that the completed, auto-populated code is not also submitted by the software, the user can simply hit the enter button or the like with the completed code in the input field to submit the code.

If there is no metasurface detected, or one is detected but the ID thereof does not match the user's expected unique ID, operation 2206 instead branches to operations 2210 and 2212 for conventional two-factor authentication request verification, e.g., email to a registered address associated with the credentials, a telephone call or text to a registered telephone number associated with the credentials, or some other method. Assuming this occurs successfully, authentication is completed as represented by operation 2214. Note that operations 2210 and 2212 are backup operations so that a user can access his or her protected data (e.g., via bank account website, etc.) without the metasurface, although the conventional drawbacks related to needing the secondary manual entry actions remain with the backup technique.

Figure 23:
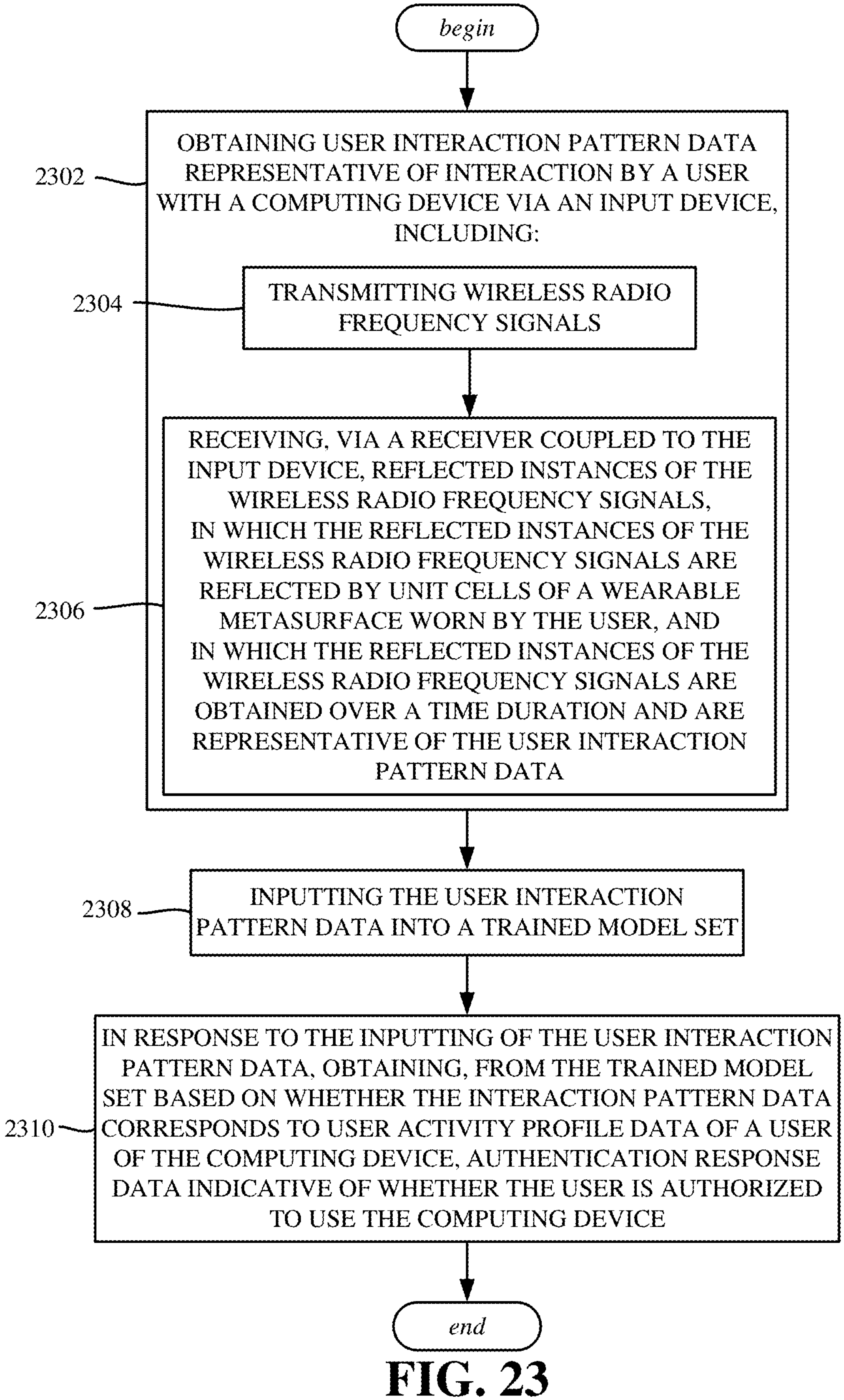
FIG. 23 is a flow diagram showing example operations related to detecting proximity of a metasurface to a computing device, in which the metasurface includes unit cells having symmetrical or substantially symmetrical resonating unit cells incorporated into a wearable device, in accordance with various example embodiments and implementations of the subject disclosure.

One or more implementations can be embodied in a system, such as represented in the example operations of FIG. 23, and for example can include at least one processor memory that stores computer executable components and/or operations, and at least one processor that executes computer executable components and/or operations stored in the memory. Example operations can include operation 2302, which represents obtaining user interaction pattern data representative of interaction by a user with a computing device via an input device, which can include example operations 2304 and 2306. Example operation 2304 represents transmitting wireless radio frequency signals. Example operation 2306 represents receiving, via a receiver coupled to the input device, reflected instances of the wireless radio frequency signals, in which the reflected instances of the wireless radio frequency signals are reflected by unit cells of a wearable metasurface worn by the user, and in which the reflected instances of the wireless radio frequency signals are obtained over a time duration and are representative of the user interaction pattern data. Example operation 2308 represents inputting the user interaction pattern data into a trained model set. Example operation 2310 represents, in response to the inputting of the user interaction pattern data, obtaining, from the trained model set based on whether the interaction pattern data corresponds to user activity profile data of a user of the computing device, authentication response data indicative of whether the user is authorized to use the computing device.

The authentication response data can indicate that the user can be authorized to use the computing device, and further operations can include obtaining a multifactor authentication request with respect to a login access attempt associated with a user identity, and responding, based on the authentication response data, to the multifactor authentication request on behalf of the user associated with the user identity.

The authentication response data may not indicate that the user can be authorized to use the computing device, and further operations can include at least one of: taking an action to authenticate a user identity associated with the user, or outputting a security alert.

The wearable metasurface can be incorporated into a ring designed to be worn on a finger of the user.

The input device can include at least one: of a pointing device or a keyboard.

The user interaction pattern data can include received data that satisfies a specified peak threshold level corresponding to user activity peaks in the reflected instances of the wireless radio frequency signals obtained over the time duration. The specified peak threshold level can be adjustable based on location data associated with a current location of the computing device.

The trained model set can include at least one of: a convolutional neural network model, or a long short-term memory-based recurrent neural network.

The user interaction pattern data can include at least one of: raw signal data representative of at least one raw signal representative of the interaction, fast Fourier transform spectrum image data representative of at least one fast Fourier transform spectrum image representative of the interaction, wavelet spectrum image data representative of at least one wavelet spectrum image representative of the interaction, or threshold-based feature data representative of at least one feature representative of the interaction that satisfies at least one defined threshold. Further operations can include preprocessing the user interaction pattern data via time domain analysis to obtain first preprocessed data, obtaining first feature data, from the first preprocessed data, for first input into the trained model set, preprocessing the user interaction pattern via frequency domain analysis to obtain second preprocessed data, and obtaining second feature data, from the second preprocessed data, for second input into the trained model set.

The user interaction pattern data can include time series data based on the raw signal data, and inputting the user interaction pattern data into the trained model set can include inputting the time series data into a long short-term memory-based recurrent neural network, and inputting output data from the long short-term memory-based recurrent neural network into a one-dimensional convolutional layer to obtain temporal data and localized feature data.

The user interaction pattern data can include the fast Fourier transform spectrum image data, and inputting the user interaction pattern data into the trained model set can include inputting the fast Fourier transform spectrum image data into an alternating sequence of two-dimensional convolutional layers and pooling layers to obtain spatial-frequency pattern data.

The user interaction pattern data can include the wavelet spectrum image data, and inputting the user interaction pattern data into the trained model set can include inputting the wavelet spectrum image data into an alternating sequence of two-dimensional convolutional layers and pooling layers to obtain spatial-frequency pattern data.

The user interaction pattern data can include the threshold-based feature data, and inputting the user interaction pattern data into the trained model set can include inputting the threshold-based feature data into an alternating sequence of into a one-dimensional convolutional layer to determine, from the user interaction pattern data, relationship information representative of at least one relationship corresponding to the interaction.

Figure 24:
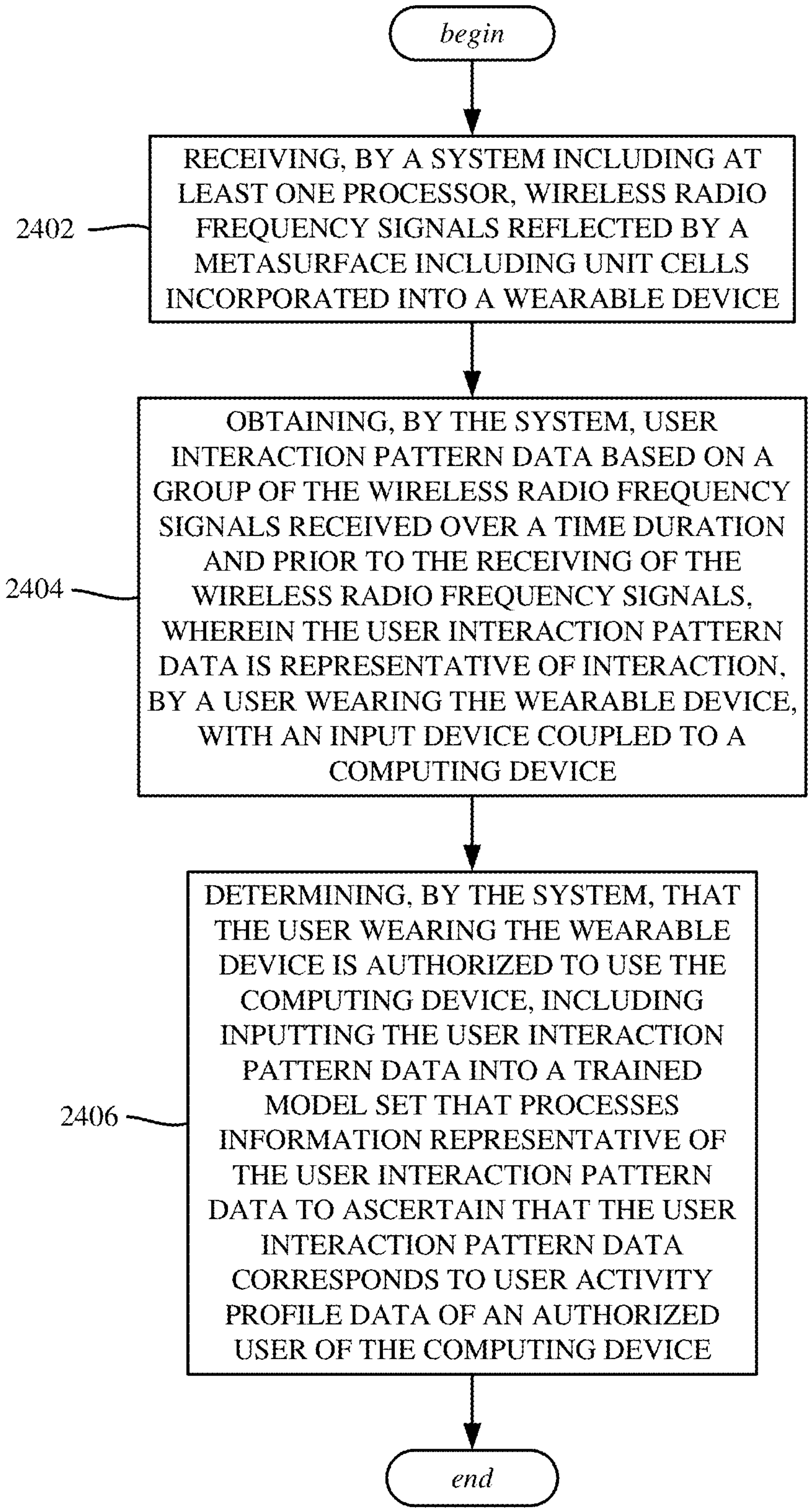
FIG. 24 is a flow diagram showing example operations related to determining that a user wearing a wearable device is authorized to use a computing device, based on user interaction pattern data input into a trained model set, in accordance with various example embodiments and implementations of the subject disclosure.

One or more example embodiments and/or implementations, such as corresponding to example operations of a method, can be represented in FIG. 24. Example operation 2402 represents receiving, by a system including at least one processor, wireless radio frequency signals reflected by a metasurface including unit cells incorporated into a wearable device. Example operation 2404 represents obtaining, by the system, user interaction pattern data based on a group of the wireless radio frequency signals received over a time duration and prior to the receiving of the wireless radio frequency signals, the user interaction pattern data can be representative of interaction, by a user wearing the wearable device, with an input device coupled to a computing device. Example operation 2406 represents determining, by the system, that the user wearing the wearable device can be authorized to use the computing device, including inputting the user interaction pattern data into a trained model set that processes information representative of the user interaction pattern data to ascertain that the user interaction pattern data corresponds to user activity profile data of an authorized user of the computing device.

Further operations can include obtaining, by the system, login credentials corresponding to a login access attempt by the user to a site, submitting, by the system, the login credentials to the site, in response to the submitting of the login credentials, receiving, by the system, a multifactor authentication request, and responding, by the system, to the multifactor authentication request on behalf of the user based on the determining that the user wearing the wearable device can be authorized to use the computing device.

Obtaining the user interaction pattern data based on the group of the wireless radio frequency signals received over the time duration can include filtering the group of the wireless radio frequency signals into the user interaction pattern data based on user activity within the time duration that satisfies defined peak user activity threshold data.

Figure 25:
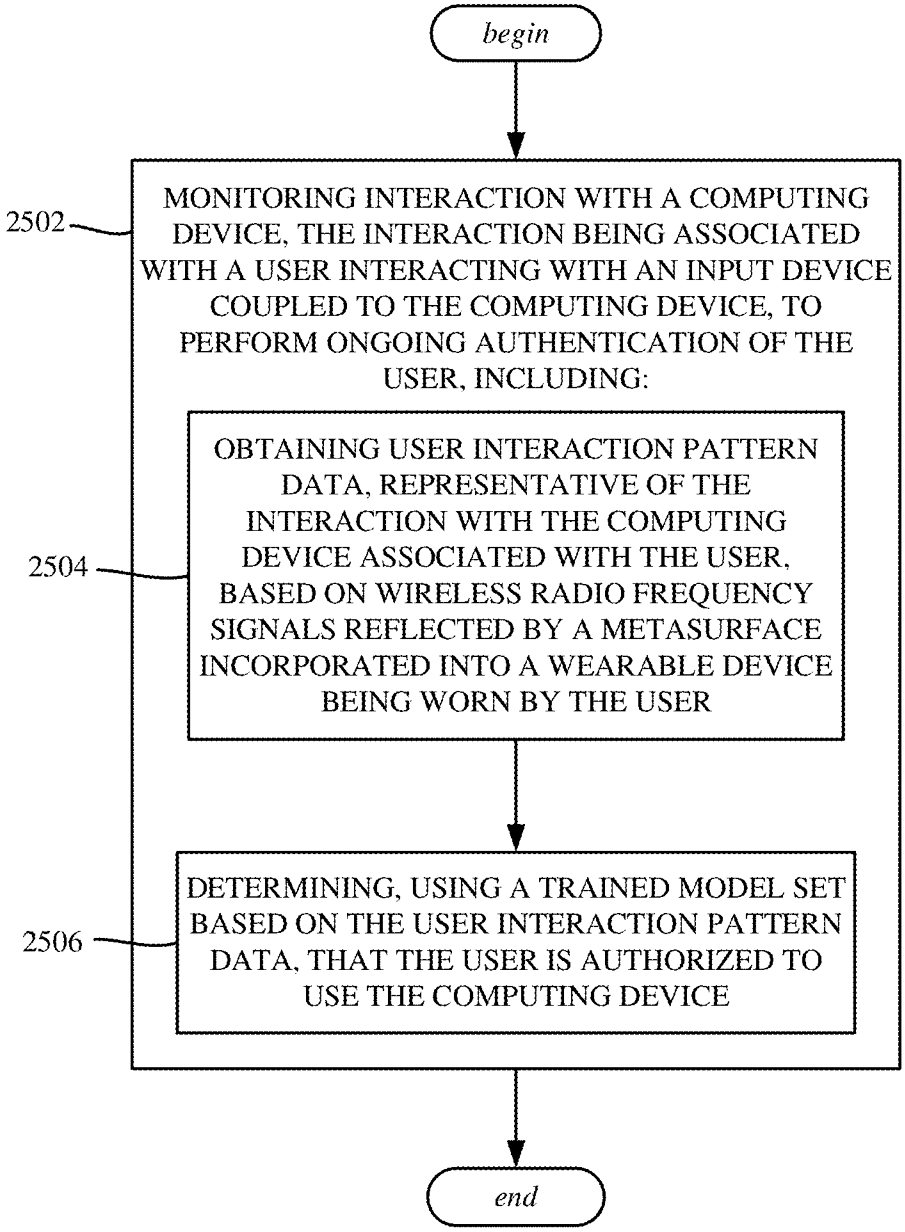
FIG. 25 is a flow diagram showing example operations related to monitoring interaction with a computing device to perform ongoing authentication of a user, based on a trained model set determining from user interaction pattern data that the is user authorized to use the computing device, in accordance with various example embodiments and implementations of the subject disclosure.

FIG. 25 summarizes various example operations, e.g., corresponding to a machine-readable medium, including executable instructions that, when executed by a processor of a target cluster, facilitate performance of operations. Example operation 2502 represents monitoring interaction with a computing device, the interaction being associated with a user interacting with an input device coupled to the computing device, to perform ongoing authentication of the user, which can include example operations 2504 and 2506. Example operation 2504 represents obtaining user interaction pattern data, representative of the interaction with the computing device associated with the user, based on wireless radio frequency signals reflected by a metasurface incorporated into a wearable device being worn by the user. Example operation 2506 represents determining, using a trained model set based on the user interaction pattern data, that the user is authorized to use the computing device.

The interaction can be a first interaction, the user interaction pattern data can be first user interaction pattern data, the wireless radio frequency signals can be first wireless radio frequency signals, and further operations can include obtaining second user interaction pattern data, representative of a second interaction with the computing device associated with the user, based on second wireless radio frequency signals reflected by the metasurface, determining, using a trained model set based on the second user interaction pattern data, that the user can be potentially not authorized to use the computing device, and taking an action based on the user being potentially not authorized to use the computing device.

Taking the action can include at least one of: outputting a security alert, or attempting to authenticate the user based on credential input, other than the second user interaction pattern data, requested from the user.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining user interaction pattern data representative of interaction by a user with a computing device via an input device, configured to:

transmitting wireless radio frequency signals;

receiving, via a receiver coupled to the input device, reflected instances of the wireless radio frequency signals, wherein the reflected instances of the wireless radio frequency signals are reflected by unit cells of a wearable metasurface worn by the user, and wherein the reflected instances of the wireless radio frequency signals are obtained over a time duration and are representative of the user interaction pattern data;

inputting the user interaction pattern data into a trained model set; and in response to the inputting of the user interaction pattern data, obtaining, from the trained model set based on whether the user interaction pattern data corresponds to user activity profile data of a user of the computing device, authentication response data indicative of whether the user is authorized to use the computing device.

2. The system of claim 1, wherein the authentication response data indicates that the user is authorized to use the computing device, and wherein the operations further comprise obtaining a multifactor authentication request with respect to a login access attempt associated with a user identity, and responding, based on the authentication response data, to the multifactor authentication request on behalf of the user associated with the user identity.

3. The system of claim 1, wherein the authentication response data does not indicate that the user is authorized to use the computing device, and wherein the operations further comprise at least one of: taking an action to authenticate a user identity associated with the user, or outputting a security alert.

4. The system of claim 1, wherein the wearable metasurface is incorporated into a ring designed to be worn on a finger of the user.

5. The system of claim 1, wherein the input device comprises at least one: of a pointing device or a keyboard.

6. The system of claim 1, wherein the user interaction pattern data comprises received data that satisfies a specified peak threshold level corresponding to user activity peaks in the reflected instances of the wireless radio frequency signals obtained over the time duration.

7. The system of claim 6, wherein the specified peak threshold level is adjustable based on location data associated with a current location of the computing device.

8. The system of claim 1, wherein the trained model set comprises at least one of: a convolutional neural network model, or a long short-term memory-based recurrent neural network.

9. The system of claim 1, wherein the user interaction pattern data comprises at least one of: raw signal data representative of at least one raw signal representative of the interaction, fast Fourier transform spectrum image data representative of at least one fast Fourier transform spectrum image representative of the interaction, wavelet spectrum image data representative of at least one wavelet spectrum image representative of the interaction, or threshold-based feature data representative of at least one feature representative of the interaction that satisfies at least one defined threshold.

10. The system of claim 9, wherein the operations further comprise preprocessing the user interaction pattern data via time domain analysis to obtain first preprocessed data, obtaining first feature data, from the first preprocessed data, for first input into the trained model set, preprocessing the user interaction pattern via frequency domain analysis to obtain second preprocessed data, and obtaining second feature data, from the second preprocessed data, for second input into the trained model set.

11. The system of claim 9, wherein the user interaction pattern data comprises time series data based on the raw signal data, and wherein the inputting of the user interaction pattern data into the trained model set comprises inputting the time series data into a long short-term memory-based recurrent neural network, and inputting output data from the long short-term memory-based recurrent neural network into a one-dimensional convolutional layer to obtain temporal data and localized feature data.

12. The system of claim 9, wherein the user interaction pattern data comprises the fast Fourier transform spectrum image data, and wherein the inputting of the user interaction pattern data into the trained model set comprises inputting the fast Fourier transform spectrum image data into an alternating sequence of two-dimensional convolutional layers and pooling layers to obtain spatial-frequency pattern data.

13. The system of claim 9, wherein the user interaction pattern data comprises the wavelet spectrum image data, and wherein the inputting of the user interaction pattern data into the trained model set comprises inputting the wavelet spectrum image data into an alternating sequence of two-dimensional convolutional layers and pooling layers to obtain spatial-frequency pattern data.

14. The system of claim 9, wherein the user interaction pattern data comprises the threshold-based feature data, and wherein the inputting of the user interaction pattern data into the trained model set comprises inputting the threshold-based feature data into an alternating sequence of into a one-dimensional convolutional layer to determine, from the user interaction pattern data, relationship information representative of at least one relationship corresponding to the interaction.

15. A method, comprising:

receiving, by a system comprising at least one processor, wireless radio frequency signals reflected by a metasurface comprising unit cells incorporated into a wearable device;

obtaining, by the system, user interaction pattern data based on a group of the wireless radio frequency signals received over a time duration and prior to the receiving of the wireless radio frequency signals, wherein the user interaction pattern data is representative of interaction, by a user wearing the wearable device, with an input device coupled to a computing device; and determining, by the system, that the user wearing the wearable device is authorized to use the computing device, comprising inputting the user interaction pattern data into a trained model set that processes information representative of the user interaction pattern data to ascertain that the user interaction pattern data corresponds to user activity profile data of an authorized user of the computing device.

16. The method of claim 15, further comprising:

obtaining, by the system, login credentials corresponding to a login access attempt by the user to a site;

submitting, by the system, the login credentials to the site;

in response to the submitting of the login credentials, receiving, by the system, a multifactor authentication request; and responding, by the system, to the multifactor authentication request on behalf of the user based on the determining that the user wearing the wearable device is authorized to use the computing device.

17. The method of claim 15, wherein the obtaining of the user interaction pattern data based on the group of the wireless radio frequency signals received over the time duration comprises filtering the group of the wireless radio frequency signals into the user interaction pattern data based on user activity within the time duration that satisfies defined peak user activity threshold data.

18. A non-transitory machine-readable medium, comprising executable instructions that, when executed by at least one processor, facilitate performance of operations, the operations comprising:

monitoring interaction with a computing device, the interaction being associated with a user interacting with an input device coupled to the computing device, to perform ongoing authentication of the user, comprising:

obtaining user interaction pattern data, representative of the interaction with the computing device associated with the user, based on wireless radio frequency signals reflected by a metasurface incorporated into a wearable device being worn by the user; and determining, using a trained model set based on the user interaction pattern data, that the user is authorized to use the computing device.

19. The non-transitory machine-readable medium of claim 18, wherein the interaction is a first interaction, wherein the user interaction pattern data is first user interaction pattern data, wherein the wireless radio frequency signals are first wireless radio frequency signals, and wherein the operations further comprise:

obtaining second user interaction pattern data, representative of a second interaction with the computing device associated with the user, based on second wireless radio frequency signals reflected by the metasurface, determining, using a trained model set based on the second user interaction pattern data, that the user is potentially not authorized to use the computing device, and taking an action based on the user being potentially not authorized to use the computing device.

20. The non-transitory machine-readable medium of claim 19, wherein the taking of the action comprises at least one of: outputting a security alert, or attempting to authenticate the user based on credential input, other than the second user interaction pattern data, requested from the user.

* * * * *